United States Patent [19]

Li et al.

[11] Patent Number: 5,672,858
[45] Date of Patent: Sep. 30, 1997

[54] APPARATUS AND METHOD FOR READING INDICIA USING CHARGE COUPLED DEVICE AND SCANNING LASER BEAM TECHNOLOGY

[75] Inventors: Yajun Li, Oakdale; Joseph Katz, Stony Brook; Jerome Swartz, Old Field; Daniel McGlynn, Brooklyn, all of N.Y.

[73] Assignee: Symbol Technologies Inc., Holtsville, N.Y.

[21] Appl. No.: 269,170

[22] Filed: Jun. 30, 1994

[51] Int. Cl.$^6$ .................................................. G06K 7/10
[52] U.S. Cl. ......................................................... 235/462
[58] Field of Search .................................... 235/462, 472

[56] References Cited

U.S. PATENT DOCUMENTS

| | | |
|---|---|---|
| 4,251,798 | 2/1981 | Swartz et al. . |
| 4,360,798 | 11/1982 | Swartz et al. . |
| 4,369,361 | 1/1983 | Swartz et al. . |
| 4,387,297 | 6/1983 | Swartz et al. . |
| 4,387,397 | 6/1983 | Dietz . |
| 4,409,470 | 10/1983 | Shepard et al. . |
| 4,460,120 | 7/1984 | Shepard et al. . |
| 4,736,095 | 4/1988 | Shepard et al. . |
| 4,760,248 | 7/1988 | Swartz et al. . |
| 4,794,239 | 12/1988 | Allais . |
| 4,806,742 | 2/1989 | Swartz et al. . |
| 4,816,660 | 3/1989 | Swartz et al. . |
| 4,835,374 | 5/1989 | Swartz et al. . |
| 4,845,350 | 7/1989 | Shepard et al. . |
| 4,896,026 | 1/1990 | Krichever et al. . |
| 4,963,756 | 10/1990 | Quan et al. ............................ 235/462 |
| 5,010,241 | 4/1991 | Butterworth ........................ 235/462 |
| 5,017,765 | 5/1991 | Shepard et al. . |
| 5,021,641 | 6/1991 | Swartz et al. . |
| 5,192,856 | 3/1993 | Schaham ............................ 235/472 |
| 5,235,167 | 8/1993 | Dvorkis et al. . |
| 5,276,315 | 1/1994 | Surka . |
| 5,304,786 | 4/1994 | Pavlidis et al. . |
| 5,331,176 | 7/1994 | Sant'Anselmo et al. ........... 250/566 |

FOREIGN PATENT DOCUMENTS

| | | |
|---|---|---|
| 0 385 478 | 9/1990 | European Pat. Off. . |
| 0 460 669 A2 | 12/1991 | European Pat. Off. . |
| 524029 | 1/1993 | European Pat. Off. ............... 235/462 |
| 0 569 962 A2 | 11/1993 | European Pat. Off. . |
| 6-238977 | 11/1985 | Japan . |
| 1-93871 | 4/1989 | Japan . |
| 3-198175 | 8/1991 | Japan . |
| 3-266089 | 11/1991 | Japan . |

*Primary Examiner*—Donald T. Hajec
*Assistant Examiner*—Jeffrey R. Filipek

[57] ABSTRACT

A scanning device for reading indicia of differing light reflectivity, including bar code or matrix array symbols, has a single light emitter, such as a laser or light emitting diode, for generating a scanning light beam to visually illuminate sequential portions of the indicia. A sensor, such as a charge coupled or other solid state imaging device, simultaneously detects light reflected from portions of the indicia and generates an electrical signal representative of the spacial intensity variations the portions of the indicia. The scanning device may also include an ambient light sensor, and a second light emitter for use only in aiming or orienting the scanning device. A photodetector may also be provided to separately detect one symbol virtually simultaneous with the detection of another symbol by the sensor or to provide dual modalities. A method for reading indicia is also provided.

46 Claims, 16 Drawing Sheets

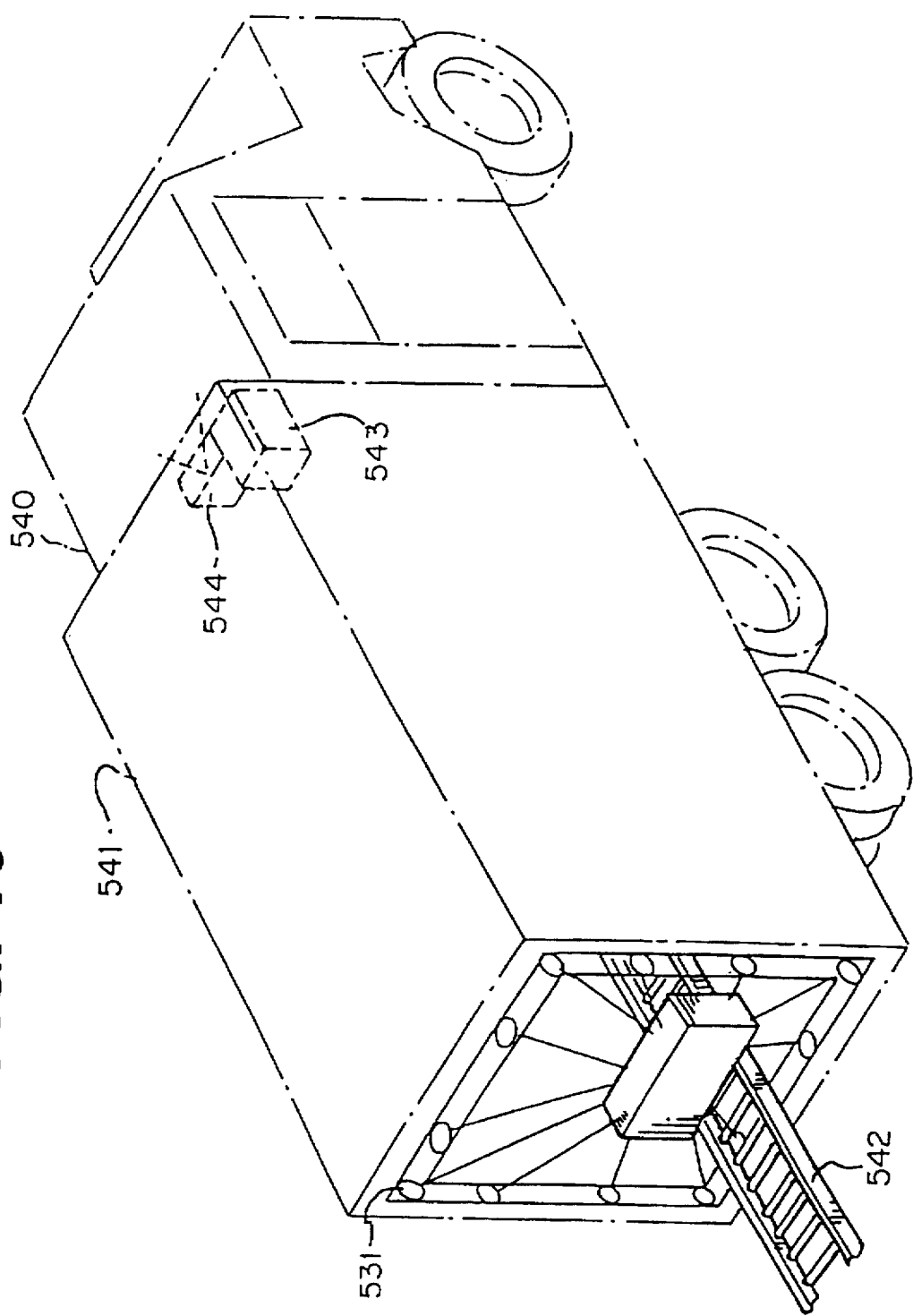

APPARATUS AND METHOD FOR READING INDICIA USING CHARGE COUPLED DEVICE AND SCANNING LASER BEAM TECHNOLOGY

REFERENCE TO RELATED APPLICATIONS

This application is related to U.S. patent application Ser. No. 08/317,775 filed Oct. 4, 1994, which is a continuation of Ser. No. 07/897,835 filed Jun. 12, 1992 now abandoned.

This application is also related to Ser. No. 08/294,438, filed Aug. 23, 1994, which was a continuation of Ser. No. 08/037,143, filed Mar. 25, 1993, now abandoned, (which was a Divisional Application of Ser. No. 07/715,267, filed Jun. 14, 1991, now U.S. Pat. No. 5,235,167).

This application is also related to application Ser. No. 08/268,589, filed simultaneously with the filing of this application on Jun. 30, 1994, entitled "Multiple Laser Indicia Reader Optionally Utilizing a Charge Coupled Device (CCD) Detector and Operating Method Therefor" and application Ser. No. 08/269,171 filed simultaneously with the filing of this application on Jun. 30, 1994, entitled "Tunnel Scanner with Multiple Scan Units Having Multiple Light Emitters and Optionally Utilizing a Charge Coupled Device Detector or Sensor Array" and application Ser. No. 08/268,913 filed simultaneously with the filing of this application on Jun. 30, 1994, entitled "Method and Apparatus for Reading Two-Dimensional Bar Code Symbols With an Elongated Laser Line".

This application is also related to pending application Ser. No. 08/377,998, filed Jan. 25, 1995, which is a continuation of Ser. No. 08/093,967, filed Jul. 21, 1993 (now U.S. Pat. No. 5,396,055), which was a division of application Ser. No. 895,277, filed Jun. 8, 1992 (now U.S. Pat. No. 5,262,628), which was a division of application Ser. No. 272,545, filed Nov. 17, 1989 (now U.S. Pat. No. 5,130,529, issued Jul. 14, 1992), which was a division of application Ser. No. 148,555, filed Jan. 26, 1988 (now U.S. Pat. No. 4,845,350, issued Jul. 4, 1989), which was a division of application Ser. No. 883,923, filed Jul. 10, 1986 (now U.S. Pat. No. 4,673,805, issued Jul. 16, 1987), which was a division of application Ser. No. 342,231, filed Jan. 25, 1982 (now U.S. Pat. No. 4,409,470, issued Oct. 11, 1983). This application discloses subject matter disclosed in application Ser. No. 519,107, filed Aug. 1, 1983 (now U.S. Pat. No. 4,460,120, issued Jul. 17, 1984), which was also a division of said application Ser. No. 342,231. Further, this application discloses subject matter disclosed in application Ser. No. 831,415, filed Feb. 20, 1986 (now U.S. Pat. No. 4,736,095, issued Apr. 5, 1988), which was a division of application Ser. No. 519,523, which was a division of application Ser. No. 342,231. Additionally, this application is also related to application Ser. No. 454,182, filed Dec. 21, 1989 (now U.S. Pat. No. 5,017,765, issued May 21, 1991), and application Ser. No. 454,144, filed Dec. 21, 1989 (now U.S. Pat. No. 5,021,641, issued Jun. 4, 1991), the application Ser. Nos. 454,182 and 454,144 emanating from original application Ser. No. 342,231.

This application is also related to pending application Ser. No. 08/074,641, filed Jun. 11, 1993, which was a division of application Ser. No. 07/931,728, filed Aug. 18, 1992 (now U.S. Pat. No. 5,250,792), which was a division of application Ser. No. 07/690,705, filed Apr. 24, 1991 (now U.S. Pat. No. 5,247,162), which was a division of application Ser. No. 454,144, filed Dec. 21, 1989 (now U.S. Pat. No. 5,021,641), which was a division of application Ser. No. 295,151, filed Jan. 9, 1989 (now U.S. Pat. No. 4,897,532), which was a continuation of application Ser. No. 148,669, filed Jan. 26, 1988 (now U.S. Pat. No. 4,825,057), which was a division of application Ser. No. 706,502, filed Feb. 28, 1985 (now abandoned). The following applications were also based upon application Ser. No. 196,021, filed May 19, 1988 (now U.S. Pat. No. 4,816,660); application Ser. No. 148,438, filed Jan. 26, 1988 (now U.S. Pat. No. 4,806,742); application Ser. No. 113,898, filed Oct. 29, 1987 (now U.S. Pat. No. 4,760,248); application Ser. No. 230,746, filed Aug. 9, 1988 (now U.S. Pat. No. 4,835,374).

This application is also related to pending application Ser. No. 08/041,281, filed Mar. 30, 1993 (now U.S. Pat. No. 5,396,054), which is a continuation of application Ser. No. 07/317,553, filed Mar. 1, 1989, now abandoned.

BACKGROUND OF THE INVENTION

1. Field of the Invention

This invention generally relates to an apparatus and method operative for electro-optically reading indicia having parts of different light reflectivity, for example, bar code or matrix array symbols, and, more particularly, to apparatus using both charge coupled device (CCD) technology and laser beam scanning technology for properly positioning, orienting and/or aiming such apparatus and reading one or two-dimensional bar code symbols, and to a method therefor.

2. Description of the Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alphanumerical characters that are intended to be descriptive of the article or some characteristic thereof. Such characters are typically represented in digital form and utilized as an input to a data processing system for applications in point-of-sale processing, inventory control, and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application.

As disclosed in some of the above patents, one embodiment of such a scanning system resides, inter alia, in a hand-held, portable laser scanning head supported by a user, which is configured to allow the user to aim the head, and more particularly, a light beam, at a target and a symbol to be read.

The light source in a laser scanner bar code reader is typically a gas laser or semiconductor laser. The use of semiconductor devices as the light source in scanning systems is especially desirable because of their small size, low cost and low voltage requirements. The laser beam is optically modified, typically by a focusing optical assembly, to form a beam spot of a certain size at the target distance. It is preferred that the cross section of the beam spot at the target distance be approximately the same as the minimum width between regions of different light reflectivity, i.e., the bars and spaces of the symbol.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies, a unique "start" and "stop" character is used to indicate where the bar code begins and ends. A number of different bar code symbologies exist. These symbologies include UPC/EAN, Code 39, Code 128, Codabar, and Interleaved 2 of 5, etc.

For the purpose of our discussion, characters recognized and defined by a symbology shall be referred to as legitimate characters, while characters not recognized and defined by that symbology are referred to as illegitimate characters. Thus, an arrangement of elements not decodable by a given symbology corresponds to an illegitimate character(s) for that symbology.

In order to increase the amount of data that can be represented or stored on a given amount of surface area, several new bar code symbologies have recently been developed. One of these new code standards, Code 49, introduces a "two-dimensional" concept by stacking rows of characters vertically instead of extending the bars horizontally. That is, there are several rows of bar and space patterns, instead of only one row. The structure of Code 49 is described in U.S. Pat. No. 4,794,239, which is incorporated herein by reference. Another two-dimensional symbology, known as "PDF417", is described in U.S. patent application Ser. No. 461,881, now U.S. Pat. No. 5,304,786. Still other symbologies have been developed in which the symbol is comprised of a matrix array made up of hexagonal, square, polygonal and/or other geometric shapes. Prior art FIGS. 12A–12C depict exemplary known matrix and other type symbols. Such symbols are further described in, for example, U.S. Pat. Nos. 5,276,315 and 4,794,239. Such matrix symbols may include Vericode(TM), Datacode(TM) and UPSCODE (TM).

In the laser beam scanning systems known in the art, the laser light beam is directed by a lens or similar optical components along a light path toward a target that includes a bar code or other symbol on the surface. The moving-beam scanner operates by repetitively scanning the light beam in a line or series of lines across the symbol by means of motion of a scanning component, such as the light source itself or a mirror, disposed in the path of the light beam. The scanning component may either sweep the beam spot across the symbol and trace a scan line or pattern across the symbol, or scan the field of view of the scanner, or do both.

Bar code reading systems also include a sensor or photodetector which functions to detect light reflected or scattered from the symbol. The photodetector or sensor is positioned in the scanner in an optical path so that it has a field of view which ensures the capture of a portion of the light which is reflected or scattered off the symbol is detected and converted into an electrical signal. Electronic circuitry or software decode the electrical signal into a digital representation of the data represented by the symbol that has been scanned. For example, the analog electrical signal operated by the photodetector may be converted into a pulse width modulated digital signal, with the widths corresponding to the physical widths of the bars and spaces. Such a digitized signal is then decoded based upon the specific symbology used by the symbol into a binary representation of the data encoded in the symbol, and subsequently to the alphanumeric characters so represented.

The decoding process in known bar code reading systems usually works in the following way. The decoder receives the pulse width modulated digital signal from the bar code reader, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Moving-beam laser scanners are not the only type of optical instrument capable of reading bar code symbols. Another type of bar code reader particularly relevant to the present invention is one which incorporates detectors based upon charge coupled device (CCD) technology. In such prior art readers the size of the detector is typically smaller than the symbol to be read because of the image reduction by the objective lens in front of the CCD. The entire symbol is flooded with light from a light source such as light emitting diodes (LED) in the reader, and each CCD cell is sequentially read out to determine the presence of a bar or a space.

The working range of CCD bar code scanners can be rather limited as compared to laser based scanners and is especially low for CCD based scanners with an LED illumination source. Other features of CCD based bar code scanners are set forth in parent applications Ser. Nos. 317,553 (now abandoned) and 717,771 (now U.S. Pat. No 5,210,398) which are hereby incorporated by reference, and which are illustrative of the earlier technological techniques proposed for use in CCD scanners to acquire and read two-dimensional indicia.

OBJECTIVES OF INVENTION

It is a general object of the present invention to provide an improved indicia scanner without the limitations of prior art readers.

It is a further object of the present invention to provide an indicia scanner capable of providing the features of both a flying spot light beam scanner and an imaging scanner in a single unit.

It is a still further object of the present invention to provide a scanner for reading both two-dimensional or more complex indicia and linear bar codes.

It is yet another object of the invention to provide a hand-held indicia reader that is capable of aiming or being oriented and also imaging the field of view.

It is still another object of the invention to both perform laser scanning and CCD imaging either simultaneously, alternatively, or on a time-division multiplexed basis.

It is also an object of the invention to provide an indicia reader capable of automatically and adaptively reading indicia of different symbology types, including indicia comprised of a matrix array of geometric shapes such as a UPSCODE(TM), in close spatial proximity.

It is an even further object of the invention to provide a method which can be used to accomplish one or more of the above objectives.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

According to the present invention a scanning device for scanning or reading indicia of differing light reflectivity, such as bar code or matrix array symbols containing optically encoded information, is provided. The scanning device has a single light emitter, preferably including a laser or light emitting diode, for generating a scanning light beam to visually illuminate sequential portions of the indicia and produce reflected light from the indicia. A sensor, such as a linear array of a charge coupled device or two-dimensional array of a solid state imaging device simultaneously detects light from the light beam or ambient light reflected from portions of the indicia and generates an electrical signal representative of the reflected light from the portions of the indicia. The sensor may operate in either a scanning or non-scanning mode, the latter being similar to that of a single photodetector, or in both modes. When operating in a scanning mode, the sensor may scan a field of view at a rate faster or substantially slower than the scanning light beam. The sensor may be controlled to scan a field of view only periodically and may function as a range detector to detect the distance between the scanning device and targeted indicia. The sensors' operation as a range detector is further described below. The emitter and sensor may be disposed in a hand-held housing to allow for portable operation.

According to other aspects of the invention, the scanning device may also include an ambient light sensor for detecting the level of the ambient light in a field of view and producing an output signal if the ambient light is above a threshold value, i.e. the value at which sufficient ambient light exist for a satisfactory read of the indicia without additional light being reflected from the indicia. An activator can also be included to activate the emitter, preferably automatically, in response to the output signal. The activator may also be responsive to the electrical signal generated by the sensor. In this way, the emitter is activated, for example, only after the sensor has obtained a satisfactory read on one symbol and the emitter continues to emit a light beam until the sensor has obtained a satisfactory read of the next symbol. Unlike some prior art bar code readers, the light beam need not be deactivated after a successful decode of a symbol. More particularly, the light beam could be deactivated only if no decode had taken place after a predetermined time.

A processor for processing the electrical signal is also preferably provided. The processor typically includes an analog to digital converter for converting the electrical signal into a corresponding digital signal, and a decoder for decoding the digital signal in order to obtain the information encoded within the symbol. The processor may include a discriminator for determining whether the targeted symbol is a linear or multidimensional symbol, or a bar code symbol of a certain symbology type. A selection device is beneficially provided for deactivating the light emitter if it is determined that the targeted symbol is a multidimensional bar code symbol. The discriminator may be adapted to more generally discriminate between indicia of different symbology types or to discriminate between indicia of any desired symbology types. For example, the discriminator may be adapted to look for symbols conforming to UPSCODE(TM). The sensor can be adapted to detect visible light reflected from a portion of the symbol which is formed of a bull's eye mark. Such marks are being more frequently used in conjunction with symbols formed of a matrix array of geometric shapes, such as those conforming with UPSCODE(TM) symbology.

In accordance with yet other aspects of the invention, a scanning device for reading indicia, such as that previously described, having parts of different light reflectivity has a light source, such as a laser or light emitting diode, for generating a visible light beam. An optical element, preferably a mirror, directs the visible light beam such that a scan line is formed across the indicia. A sensor, preferably a charge coupled or other solid state imaging device, which includes an array of detection elements, images the reflection of light from the indicia, for example visible light from the visible light beam or ambient light, or a combination of the two, and generates an electrical signal representing the reflection of the light from the indicia or, stated another way, the spatial intensity variations of the indicia. The individual detection elements can be scanned at a variable scanning rate if desired. An actable controller can be provided to change the element scanning rate as desired. The scanning device may also include an integrator for processing the output of the individual detection elements to produce a single output signal. Preferably, auto-focus optics to receive the reflected light and adjust the focal point of the image on the array of detection elements are also provided. Processing circuitry for processing an electrical signal generated by the sensor may be provided. The circuitry may include a determining means which determines if the targeted indicia is a matrix code or bar code symbol, or of other differing symbology types, such as a linear or multidimensional symbol. A selection means deactivates the light emitter and/or the sensor if it is determined by the determining means that the symbol is of a particular symbology type, for example a bar code of a certain symbology category.

This configuration is particularly suitable for reading indicia, such as a bar code symbol, located within a range of approximately four to ten inches from the scan head of the scanning device. The light source, optical element and sensor can be beneficially housed in a light weight portable housing. The housing may also include an actuable controller as well as a wireless transmitter for transmitting information to a remote receiver.

The scanning device in accordance with this later configuration may also include any or all of the other features, or be adapted to perform any or all of the other functions, discussed above in connection with the other described embodiments of the invention.

In accordance with the scanning method of the present invention, a scanning light beam, preferably a visible laser light beam, is generated by a single light source to visually illuminate sequential portions of the indicia in order to produce reflected light from the indicia. The light reflected from portions of the indicia, which may be ambient light or light from the light beam, is simultaneously sensed preferably using an imaging technique. The sensing may include detecting visible light reflected from a portion of the indicia which is in the form of a bull's eye mark. The sensing may be performed only periodically. Additionally, ranging may also be performed to determine the distance to indicia. An electrical signal representative of the detected light reflected from the portions of the indicia is generated.

According to other aspects of the inventive method, the level of the ambient light in a field of view is detected and an output signal is produced if the ambient light is above a threshold value. The light beam is generated responsive to the output signal. Beneficially, the light beam can also be generated responsive to the electrical signal.

The electrical signal may be processed to obtain an indication of the type of indicia being scanned. Thus, the processing may include a first threshold of determining whether the indicia is a linear or multidimensional symbol, or a bar code symbol of a particular symbology type, and generating the scanning light beam only if the bar code symbol is determined to be a linear bar code symbol. The processing can also include generating and processing a digitized signal corresponding to the electrical signal. The processing may include discriminating between indicia of different symbology types, linear, two-dimensional or stacked bar codes, matrix codes, or other types of indicia patterns.

Accordingly, to the present invention, a visible light beam, preferably a laser light beam, is generated and directed such that it forms a scan line across said indicia. The indicia is sensed, preferably using an imaging technique, so as to sense a reflection of light from the indicia. The detected light may be, for example, reflected ambient light or visible light from the light beam. The sensing may include detecting light reflected from a portion of the indicia which is in the form of a bull's eye mark. One or more electrical signals representing the reflection of the light from the indicia is generated. If multiple electrical signals are generated, it may be desirable to process these signals to produce a single output signal. It may also be beneficial to focus, automatically, the light reflected from the indicia prior to sensing. This method is particularly suitable for reading indicia within a range of approximately four to ten inches from the scanning device. Preferably, signals corresponding to the electrical or output signal are transmitted by a wireless transmitter or transceiver to a remote receiver or transceiver.

According to other aspects of the inventive method, ambient light levels in a field of view are detected and an output signal generated if the detected ambient light is below a threshold value. The light beam is generated in response to the output signal. The electrical signal is typically processed. Processing can include converting the analog electrical signal to a corresponding digital signal, and decoding the digital signal to obtain optically encoded information represented by the indicia. The decoding may include discriminating between indicia of different symbology types, for example a bar code and a matrix array of geometric shapes, such as a UPSCODE(TM). It may also be beneficial to generate the light beam responsive to the electrical signal so that activation occurs only when necessary and appropriate for obtaining a read.

BRIEF DESCRIPTION OF THE DRAWINGS

FIG. 10 depicts a truck mounting arrangement using multiple hybrid scanners of FIG. 4A, 4B or 4C.

DETAILED DESCRIPTION OF THE PREFERRED EMBODIMENTS

Figure 1:
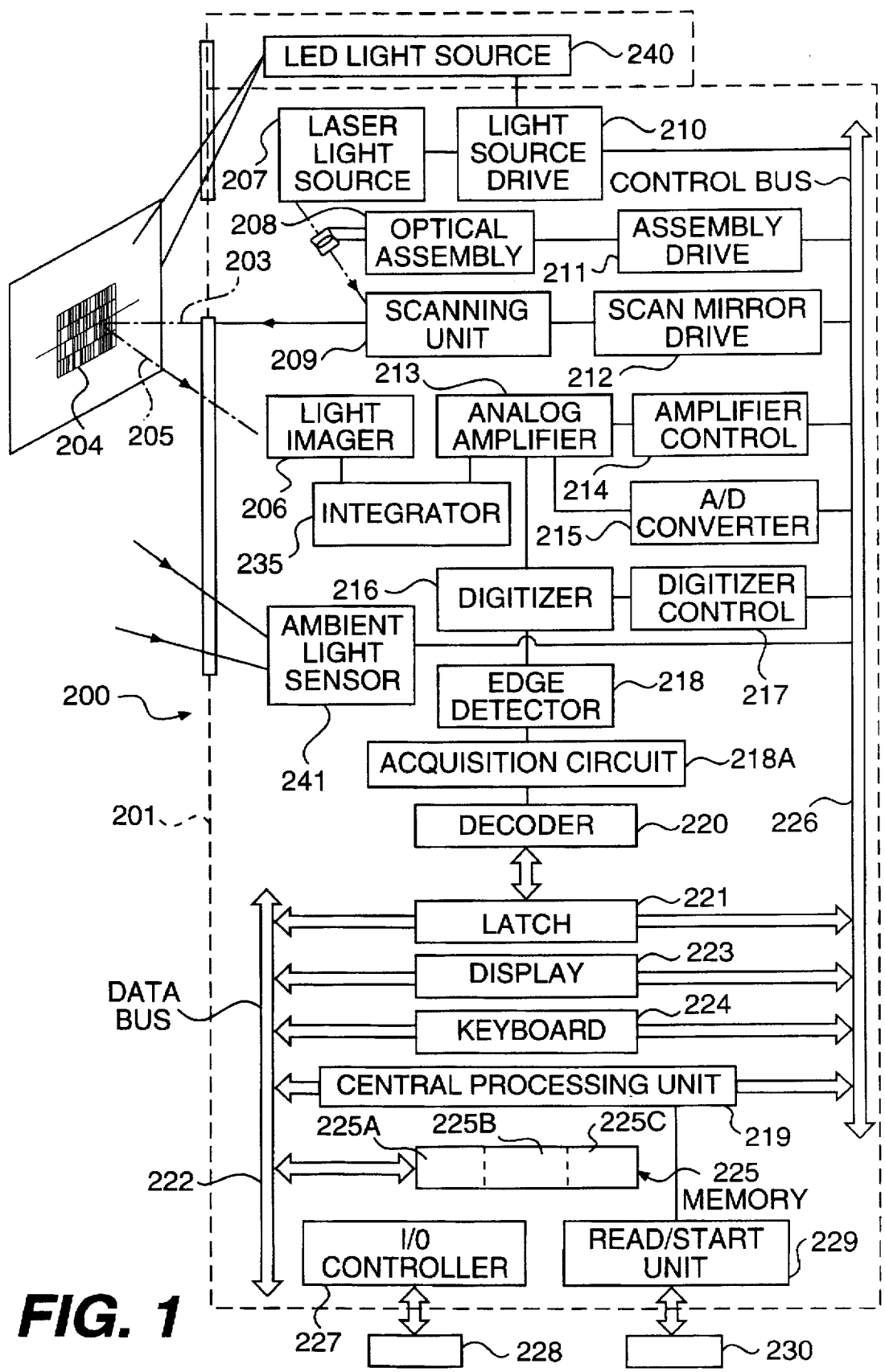
FIG. 1 is a block diagram of the scanning system according to the present invention.

Referring to FIG. 1, there is shown a highly simplified block diagram representation of an embodiment of one type of indicia reader that may be designed according to the principles of the present invention. The reader 200 may be implemented in a portable scanner, or as a desk-top workstation or stationary scanner. In the preferred embodiment, the reader is implemented in a light-weight plastic housing 201.

In one preferred embodiment, the reader 200 may be a gun-shaped device, having a pistol-grip type of handle; another embodiment is a hand-mounted unit. A movable trigger switch on the housing may be employed to allow the user to manually activate the scanner when the user has positioned the device to point at the symbol to be read. Various "triggerless" activation techniques can also be used as will be subsequently described.

The first preferred embodiment may generally be of the style disclosed in U.S. Pat. No. 4,760,248, issued to Swartz et al., or in U.S. Pat. No. 4,896,026 assigned to Symbol Technologies, Inc., and also similar to the configuration of a bar code reader commercially available as part number LS 8100 or LS 2000 from Symbol Technologies, Inc. Alternatively, or in addition, features of U.S. Pat. Nos. 4,387,297 issued to Swartz et al., or 4,409,470 issued to Shepard et al., both such patents being assigned to Symbol Technologies, Inc., may be employed in constructing the bar code reader unit of FIG. 1. These patents, U.S. Pat. Nos. 4,760,248, 4,896,026 and 4,409,470, are incorporated herein by reference, but the general design of such devices will be briefly described here for reference.

Turning to FIG. 1 in more detail, an outgoing light beam 203 is generated in the reader 200 by a light source 207, usually a laser diode or the like. The light beam from light source 207 is optically modified by an optical assembly 208 to form a beam having certain characteristics. The beam sized and shaped by the assembly 208 is applied to a scanning unit 209. The light beam is deflected by the scanning unit 209 in a specific scanning pattern, i.e. to form a single line, a linear raster scan pattern, or more complex pattern. The scanned beam 203 is then directed by the scanning unit 209 through an exit window 202 to impinge upon a bar code or other symbol 204 disposed on a target a few inches from the front of the reader. In the embodiments in which the reader 200 is portable, the user aims or positions the portable unit so this scan pattern transverses the symbol 204 to be read. Reflected and/or scattered light 205 from the symbol is detected by a light imager 206 in the reader, producing electrical signals to be processed and decoded for reproducing the data represented by the symbol. As used hereinafter, the term "reflected light" shall mean reflected and/or scattered light.

The characteristics of each of the optical components 207, 208 and 209 may be independently controlled by drive units 210, 211 and 212 respectively. The drive units are operated by digital control signals sent over the control bus 226 by the central processing unit 219, which is preferably implemented by means of a microprocessor contained in the housing 201.

A second, optional light source 240, such as an LED array, may also be provided and independently controlled by drive unit 210.

The output of the light imager 206 is applied to an integrator 235 and to an analog amplifier 213 having an adjustable or selectable gain and bandwidth. An amplifier control unit 214 is connected to the analog amplifier 213 to effect the appropriate adjustment of circuit values in the analog amplifier 213 in response to control signals applied to the control unit 214 over the control bus 226. An ambient light sensor 241 is also provided which provides an output to the control bus 226.

One output of the analog amplifier 213 is applied to an analog-to-digital (A/D) converter 215 which samples the analog signal to be tested by the CPU 219. The A/D converter is connected to the control bus 226 to transfer the sampled digital signal for processing by the CPU 219.

Another output of the analog amplifier 213 is applied to a digitizer 216. The digitizer 216 converts the analog signal from the analog amplifier 213 into a pulse width modulated digital signal. One type of digitizer is described in U.S. Pat. No. 4,360,798. Circuits such as those contained in digitizer 216 have variable threshold levels which can be appropriately adjusted. The digitizer control unit 217 is connected to the digitizer 216 and functions to effect the appropriate adjustment of threshold levels in the digitizer 216 in response to control signals applied to the control unit 217 by the CPU 219 over the control bus 226.

The output of the digitizer 216 is applied to an edge detector 218. The operation of the edge detector 218 can be explained with reference to the discussion in co-pending Ser. No. 08/317,775 with respect to corresponding component 118 in that application.

The edge detector 218 is connected to the decoder 220, which functions in the manner described in the background of the invention.

More specifically, the decoder may operate as follows. First, a timer/counter register (which may be in the CPU microprocessor 219) is reset to all zeros. Operating as a timer, the register is incremented every machine cycle until another digital bar pattern (DBP) transition occurs. Whenever a DBP transition occurs the value of the counter, or the value 255 if an overflow had occurred, is transferred to another register, and then into memory. The value of the register represents the number of machine cycles between DBP transitions, i.e., the pulse width. After the value of the register is transferred, it is once again reset to zeros and the incrementing process continues until the next transition.

At any time a bar or space may last for more than 255 count cycles. If this occurs a timer overflow interrupt is generated. The CPU 219 may run an interrupt service routine in response to the interrupt. This routine sets a flag that is used at the next DBP transition to indicate that an overflow had occurred. The interrupt service routine also checks whether the Start of Scan (SOS) signal has changed from its state at the beginning of this scan data acquisition process. If SOS has changed, a value of 255 is written as the width of the last element and the data acquisition process terminates. The end result is that a sequence of words are stored in memory, with each 16-bit word representing, for example, the pulse width representing the successive bars and spaces detected by the bar code reader.

The decode algorithm operates on the data in memory as the following exemplifies. First, right and left quiet zones are found by searching the data in memory for spaces which are large in comparison to neighboring data elements. Next, the decode of each character proceeds, beginning from the element to the right of the left quiet zone. The decode process for each character is specific to each symbology. Therefore, different character decode algorithms may be applied if the decoder is set to auto-discriminate code types. In general, the decode applies mathematical operations to calculate the number of unit modules encoded in each element, or pairs of elements for so called "delta codes" such as Code 128 and UPC. For so called "binary" codes, such as Code 39, the decoder applies mathematical operations to calculate a threshold between wide and narrow elements and then performs a relational comparison between each element and the threshold. The threshold is calculated dynamically, that is, the threshold is not the same for all the elements.

The decoded data is stored in a latch 221 which is connected to a data bus 222. The latch 221 is also connected to a control bus 226 which is also connected to the CPU 219.

In the preferred embodiment, the processing of either the pulse width data, or the decoded data, is implemented in software under control of the CPU 219. The following discussion presents an example of an algorithm that may be implemented in a computer program in the reader according to the present invention.

Figure 2:
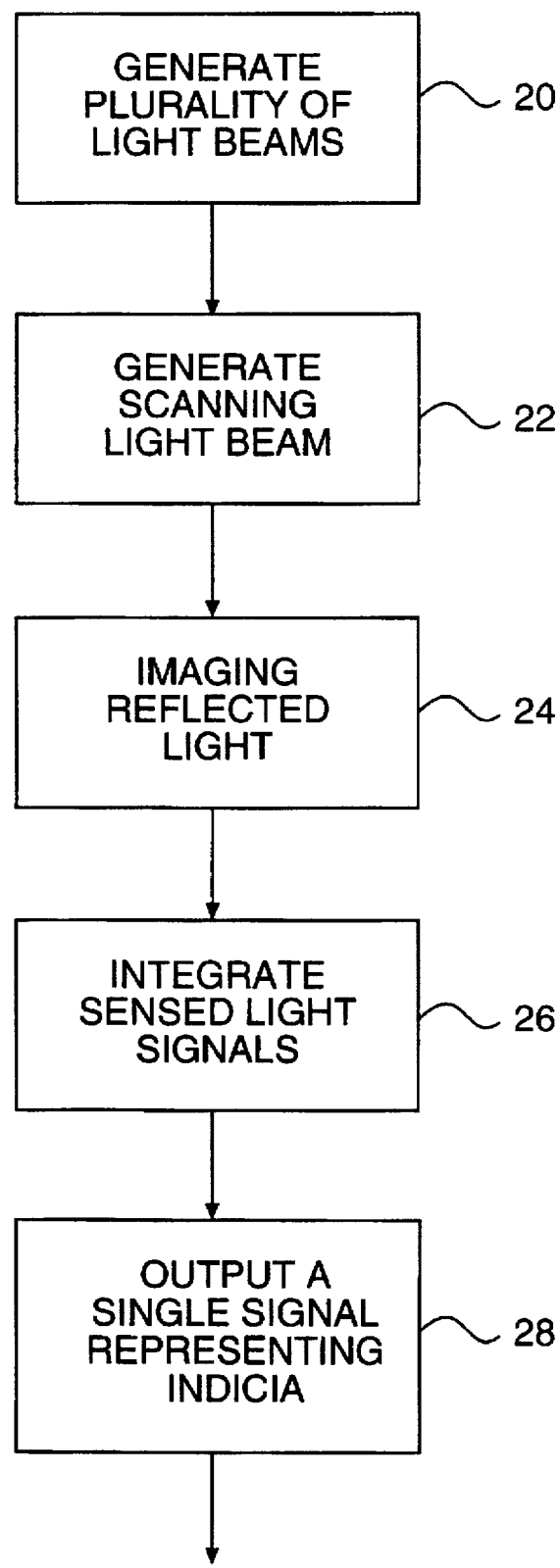
FIG. 2 shows a flow chart of the steps for scanning a symbol using an integer.

FIG. 2 is a flow chart of the basic steps used in scanning a symbol using an integrator. First, light source 240 generates a plurality of light beams (step 20) and scanning unit 209 generates a scanning light beam (step 22). Symbol 204 reflects light which is imaged toward light imager 206 having a plurality of sensors (step 24). The light sensed by the sensors is integrated (step 26) and a single signal is output representing the indicia (step 28).

Figure 3:
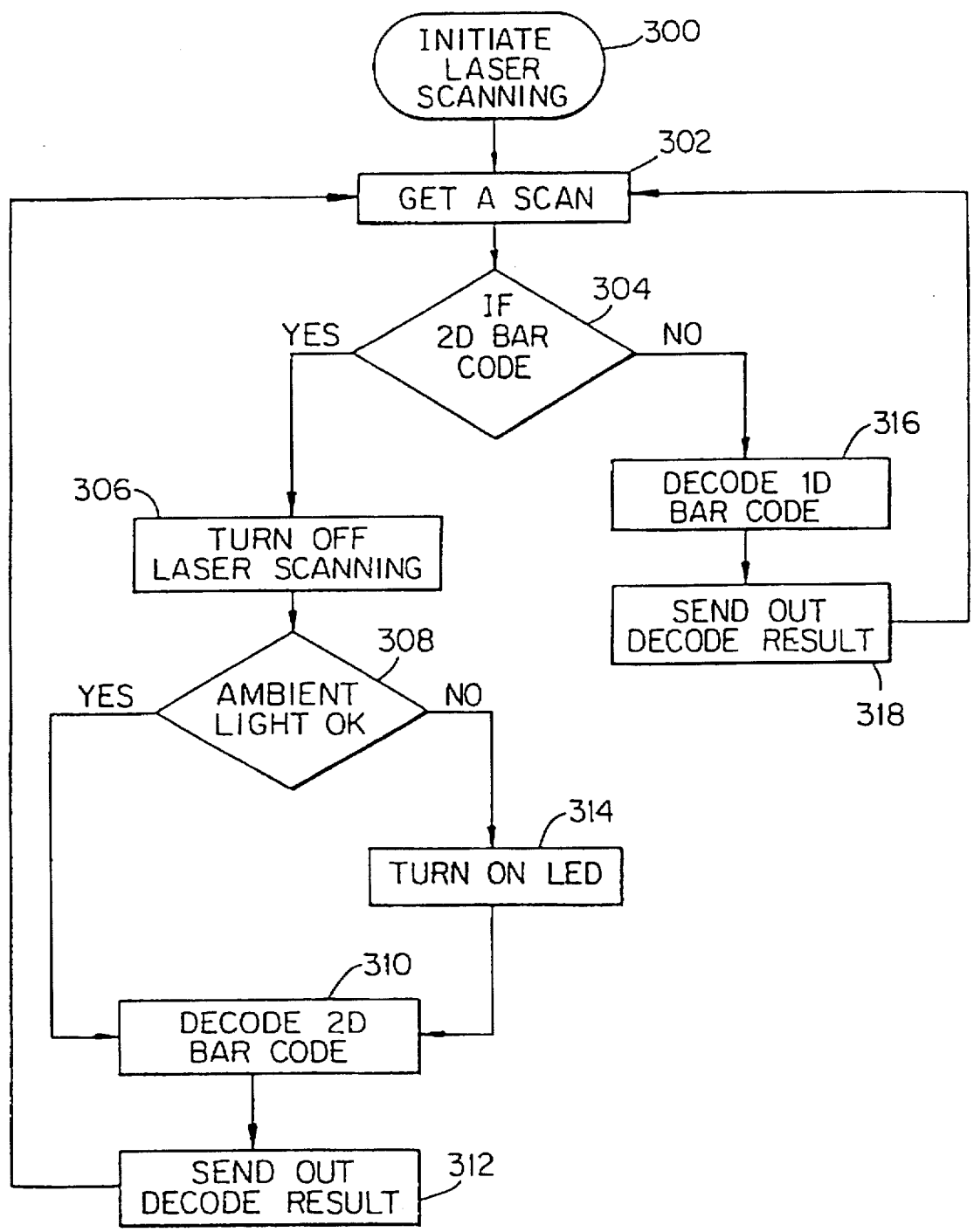
FIG. 3 is a flow chart of the operation of an algorithm used in the present invention.

FIG. 3 is a flow chart of an algorithm according to the present invention that functions to determine whether a portion of a 1D or 2D bar code symbol has been read, and whether the type of scanning to be used should be modified, or other parameters under control of the scanning system, such as the light level in the field of view, should be adjusted. It is assumed that certain predetermined initialization parameters are automatically set when the scanner is turned on, as represented by block 300. The scanner is then placed in an "interpret" mode (as opposed to a "read" mode) and the algorithm proceeds as shown in FIG. 3.

In accordance with FIG. 3, a scan is obtained in step 302 by scanning the field of view with a laser beam and detecting the reflected light with FIG. 1 detector 206. A determination is made in step 304 to determine if a two-dimensional bar code has been scanned. If the determination is positive, the laser light source is deactivated in step 306. The ambient light level is reviewed, typically against a predetermined threshold, in step 308. If the ambient light is sufficient to obtain a satisfactory read, the scan is processed through the decoder in step 310 and the results of the decoding are transmitted to the scanner in step 312 and the scan parameters modified in response thereto, if appropriate. If, in step 308, it is determined that the ambient light is insufficient to obtain a satisfactory read, then the LED is activated in step 314. The scan is then decoded and the decoding results transmitted as described above. If, in step 304, it is determined that a one dimensional bar code has been scanned, the scan is decoded in step 316 and the results of the decoding are transmitted to the scanner in step 318 and the scan parameters modified in response thereto, if appropriate. If desired, an ambient light level check, as performed in step 308, could also be performed for scans of one dimensional bar codes.

Figure 4A:
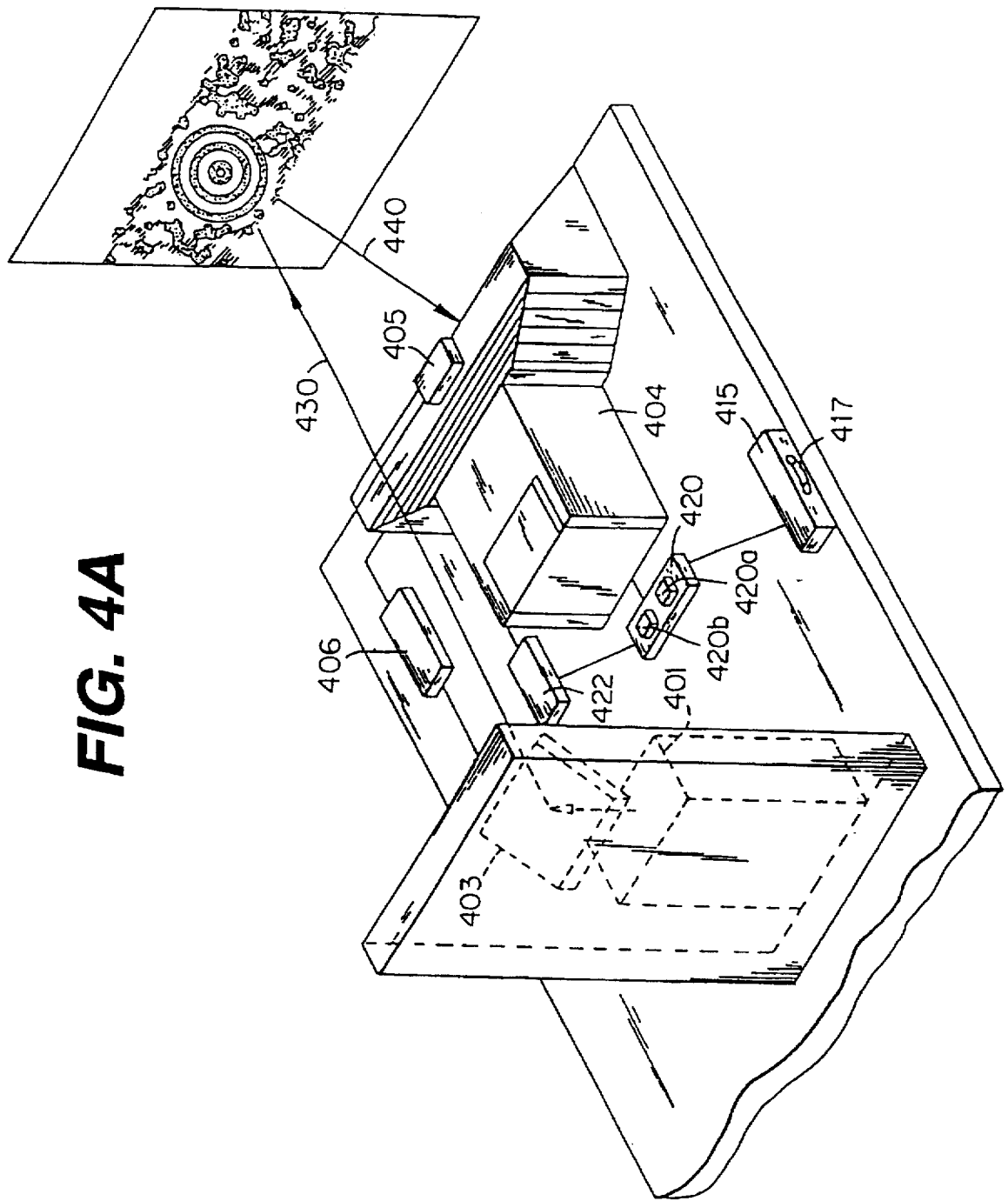
FIGS. 4A–4C are perspective views of a further embodiment of a hybrid scanner according to the present invention.
Figure 5A:
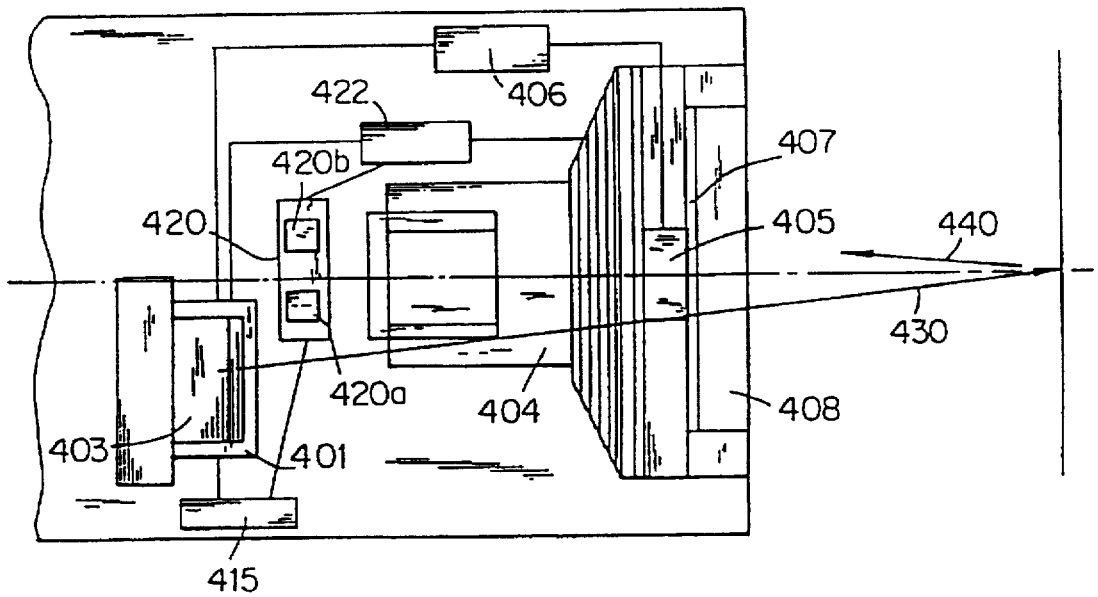
FIGS. 5A–5B are respectively a plan and elevation view of the hybrid scanner of FIG. 4A.
Figure 5B:
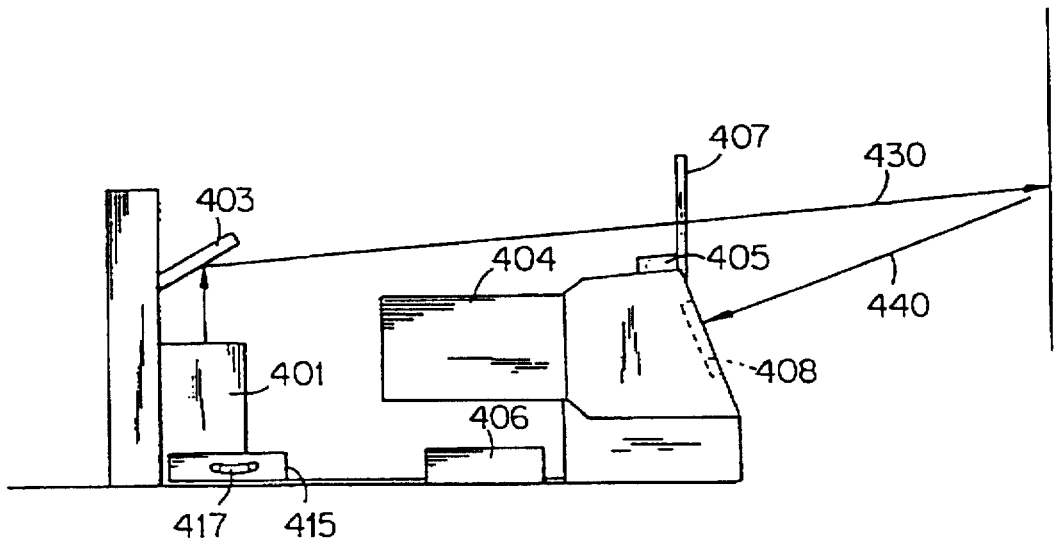

FIG. 4A is a perspective view and FIGS. 5A–5B are a plan and elevation view of a hybrid scanner in accordance with a further embodiment of the present invention. A scan assembly including a laser diode, optics and scan engine 401 emit a visible light beam 430. The beam is reflected from mirror 403 towards the targeted symbol which can be a one dimensional bar code or a more complex symbol such as a matrix array of geometric shapes as shown. The scan assembly 401 produces a visible scanning light beam, such as a flying spot light beam, which, when directed off mirror 403, forms a scan line across the targeted symbol. A charge coupled device (CCD) or other solid state imaging device 404, which includes an array of detection elements 407 detects or images reflected visible light 440 from the symbol towards which the visible scanning light beam 430 from laser diode of assembly 401 has been directed. The reflected light 440 passes through conventional optics 408 (as shown in FIGS. 5A and B) which are disposed in front of the CCD 404 detection element array. Optics 408 are automatically self focussing, so as to adjust the focal point of the image on the array of detection elements. The visible light beam 430 is beneficially used to aim the scanner at the target. The CCD 404 reads the targeted symbol using either reflected ambient light or the reflected light from the visible light beam 430 or both.

Another feature of the present invention when operating in the scanning laser beam/scanning CCD detector mode is the correlation of the speed of scanning of the laser beam with respect to the speed of scanning by the CCD detector. In the preferred embodiment, the laser beam is scanned at a much faster rate than the CCD is scanned. Thus the entire symbol is illuminated over a short period of time, and the entire CCD array integrates the light received over that period of time. The effect on the CCD is to produce an image equivalent to a narrow fixed beam of light illuminating the symbol, such as described in the related patent application entitled "Method and Apparatus for Reading Two-Dimensional Bar Code Symbols with an Elongated Laser Line", application Ser. No. 08/268,913. In accordance with another aspect of the invention, requiring more sophisticated digitizing and data processing by processor 420, the laser beam may be scanned much slower than the CCD detector. In such an embodiment the laser spot ideally illuminates just one pixel of the CCD detector at a time. Thus, the reflectivity of that pixel on the target becomes the principal signal response in the field of the view during a single scan by the CCD detector.

Since the appropriate scanning rate may not be known a priori, another feature of the present invention is to slowly vary the scanning rate (of either the scanning laser beam, or the CCD detector, or both) over a predetermined range if the initial scanning rates do not result in symbol decoding. For example, the individual detection elements can be scanned at a variable scanning rate under the control of controller 415 which can be actuated, for example, by toggle switch 417, or automatically by software implemented by processor 420, to change the scanning rate.

As shown, CCD 404 is a two-dimensional CCD camera. The scan engine is preferably small, for example, an SE-1000 scan engine manufactured by Symbol Technologies, Inc. The CCD has a one-third inch two-dimensional array, preferably 500 by 500 pixels. The field of view of the CCD is greater than 30 degrees and is plus or minus 20 degrees for the one-dimensional laser scanner. The working range of the system shown is approximately 4 to 10 inches for a MaxiCode, UPSCODE(TM) or one-dimensional UPC code.

A processor 420, including a conventional decoder 420a and a symbol discriminator 420b to determine if the symbol being read is of the particular symbology type, e.g. a matrix code such as a UPSCODE(TM) symbology, which the hybrid scanner is designed to read. The symbol discriminator receives a signal corresponding to the electrical signal generated by the CCD which represents the sensed reflected light. The symbol discriminator 420b implements an algorithm to determine if the received signal is of a type which the scanner is capable of decoding. If a "yes" determination is made, the signal is decoded by the decoder 420a. The symbol discriminator 420b, for example, can be implemented using a comparator circuit or other conventional means, to determine if the symbol conforms to the appropriate symbology type. Symbol discriminator 420b could, if desired, be replaced by software which implements the discrimination algorithm and is stored in the memory of processor 420 as discussed above in connection with FIG. 3. If the target is determined to be a conforming symbol, the decoder 420a decodes the signal and the decoded signal is transmitted to, for example, a storage device, display or further processing circuitry as discussed above with reference to FIG. 1. If the target symbol is determined by the symbol discriminator 420b to be of a non-conforming symbology, the discriminator 420b transmits a signal, for example, to the deactivator 422 and the deactivator 422 in turn transmits a signal to deactivate the CCD 404 and, if desired, the scan assembly 401.

In operation, the FIG. 4A scanner is capable of reading a symbol located within an approximate range of 4 to 10 inches from the scanning head window 407 shown in FIGS. 5A and 5B. Although a laser diode is shown in FIGS. 4A and 5A–5B, a light emitting diode (LED) could be alternatively used. If an LED is used in lieu of a laser diode, the symbology discriminator implements the algorithm shown as steps 308–312 in FIG. 3. In either configuration, an ambient light detector 405 can be used, as appropriate, to ensure that there is sufficient ambient light to obtain a proper read of the targeted symbol. The ambient light detector detects the ambient light in the field of view of the CCD. If the CCD is to image ambient light, the visible light beam is used only for aiming or orientation. In such a case, if a desired threshold is met indicating sufficient ambient light for a read, the laser diode is activated by activator 406 to target the symbol. The activator 406 may also activate the CCD, if not otherwise activated, to image the symbol. Alternatively, if reflected visible light from the emitted light beam will be detected, the ambient light detector 405 and activator 406 may be unnecessary. As a third alternative, the CCD may be capable of sensing either reflected ambient light or reflected light from the visible light produced by the laser or light emitting diode. In this case, the laser diode or LED are activated only when an ambient light threshold level is not reached, indicating that the ambient light level is insufficient to obtain a proper read. The ambient light detector 405 and activator 406 are of conventional design and can be implemented in any of a number of well known ways. It should be understood that the scanner of FIG. 4A could include features described above in connection with the other embodiments of the invention.

Figure 4B:
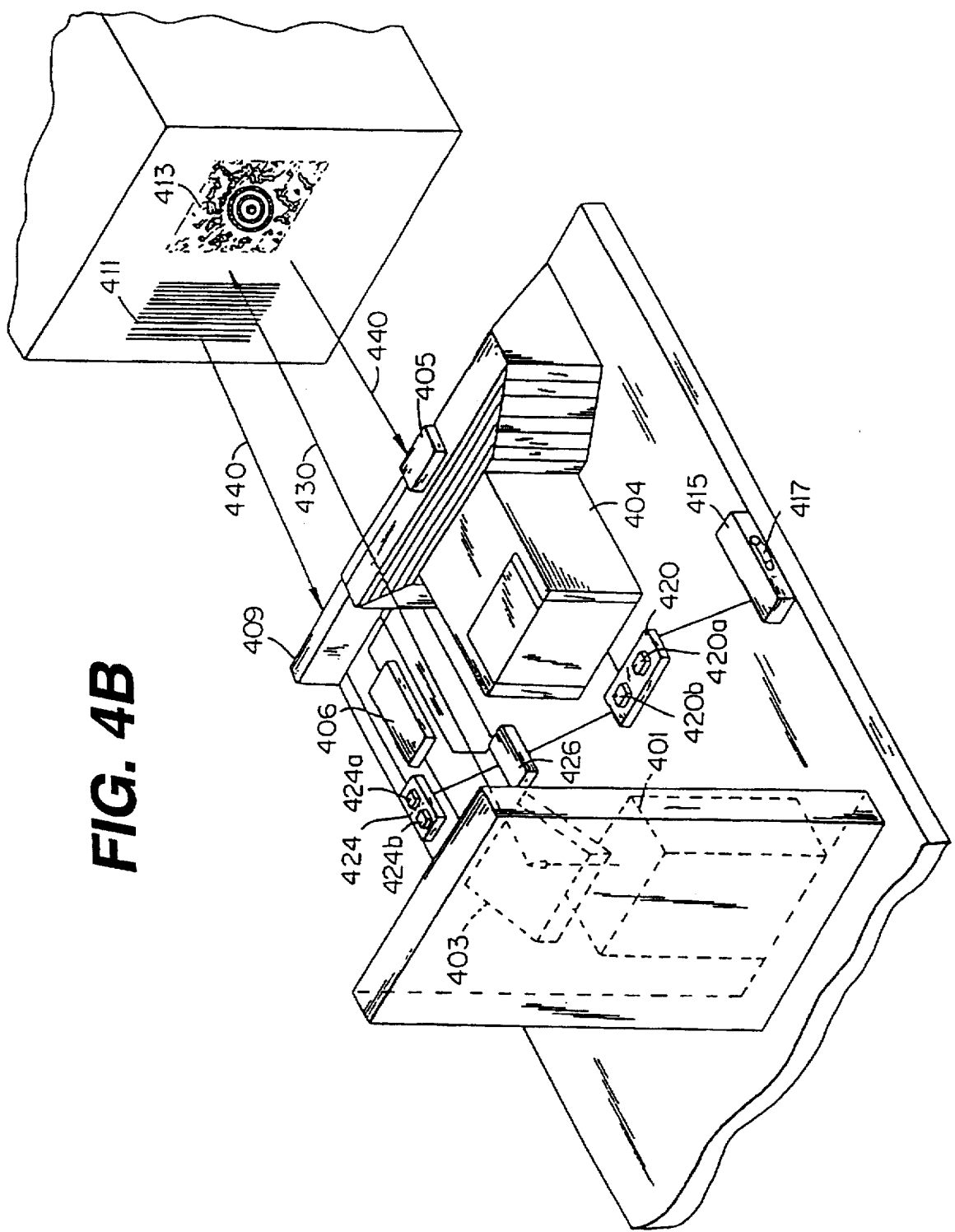

FIG. 4B depicts a somewhat altered configuration of the hybrid scanner of FIG. 4A. The FIG. 4B configuration is particularly suitable for reading dual symbols of different symbology types on a single package. For example, as shown in FIG. 4B a UPC symbol 411 is located adjacent to a UPS code symbol 413. The UPC code 411 may, for example, encode information relating to the contents of the package while UPS code 413 may include customer and/or destination information.

The 4B configuration is identical to that of the FIG. 4A embodiment except as noted below. A photodetector 409, such as a photodiode, is included in the FIG. 4B configuration and is used to detect the reflection of light 440 from the scanning light beam 430 off the UPC symbol 411. For reading two symbols on a single package, the CCD 404 separately images the reflected light 440 from the UPS code symbol 413. The reflected light imaged by the CCD 404 may be either ambient light or light from the scanning light beam. The symbols are separately processed in the conventional manner. The processing may be performed, in whole or in part, within the scan unit as may be desirable for the applicable application. The scanning beam scans across both symbol 411 and 413 and is used both for aiming and/or orienting the scan unit as well as for producing the light which will be detected after reflection from symbol 411. The light beam could be used, with respect to symbol 413, solely for aiming/orienting purposes. However, the light beam could also be used for reading the symbol 413.

A processor 420, identical to that described with reference to FIG. 4A above, includes a conventional decoder 420a and symbol discriminator 420b. The discriminator 420b determines if the symbol 413 being read by the CCD is of a particular symbology type, e.g. a matrix code conforming to UPSCODE(TM) symbology. Additionally, a processor 424, including a conventional decoder 424a and symbol discriminator 424b, is provided to determine if the symbol 411 being read by the photodiode 409 is of a particular symbology type, e.g. a bar code conforming to a UPC code symbology.

As described with reference to the FIG. 4A scanner, the symbol discriminator 420b receives a signal corresponding to an electrical signal generated by the CCD 404, which in turn corresponds to the imaged reflected light off symbol 413. The received signal is transmitted to the decoder 420a if the symbol discriminator 420b determines that the symbol 413 conforms to the appropriate symbology type. If the target is determined to be a conforming symbol, the decoder 420a decodes the signal and transmits the decoded signal to, for example, a storage device, display or further processing circuitry. If the target symbol is determined by the symbol discriminator 420b to be of a non-conforming symbology, the discriminator 420b transmits a signal to the activator/deactivator 426 reflecting the non-conforming nature of the target and, in response, the activator/deactivator 426 may, for example, transmit a signal to deactivate the CCD 404 and also, if desired, the photodiode 409. Activator/deactivator 426 is similar to deactivator 422 of the FIG. 4A scanner but is adapted to include the capability to activate and/or deactivate either or both of the CCD 404 and photodiode 409.

The symbol discriminator 424b receives a signal corresponding to an electrical signal generated by the photodiode 409, which in turn corresponds to the detected reflected light off symbol 411. The received signal is transmitted to the decoder 420a if the symbol discriminator 424b determines that symbol 411 conforms to the appropriate symbology type. The symbol discriminator 424b is similar to symbol discriminator 420b, and can use a comparator circuit, software or other conventional means to implement the applicable algorithm. If the target is determined to be a conforming symbol, the decoder 424a decodes the received signal and transmits the decoded signal to, for example, a storage device, display or further processing circuitry. If the target symbol is determined by the symbol discriminator 424b to be of a non-conforming symbology, the discriminator 424b transmits a signal to the activator/deactivator 426 reflecting the non-conforming nature of the target and, in response, the activator/deactivator 426 may, for example, transmit a signal to deactivate the photodiode 409 and also, if desired, CCD 404.

Figure 4C:
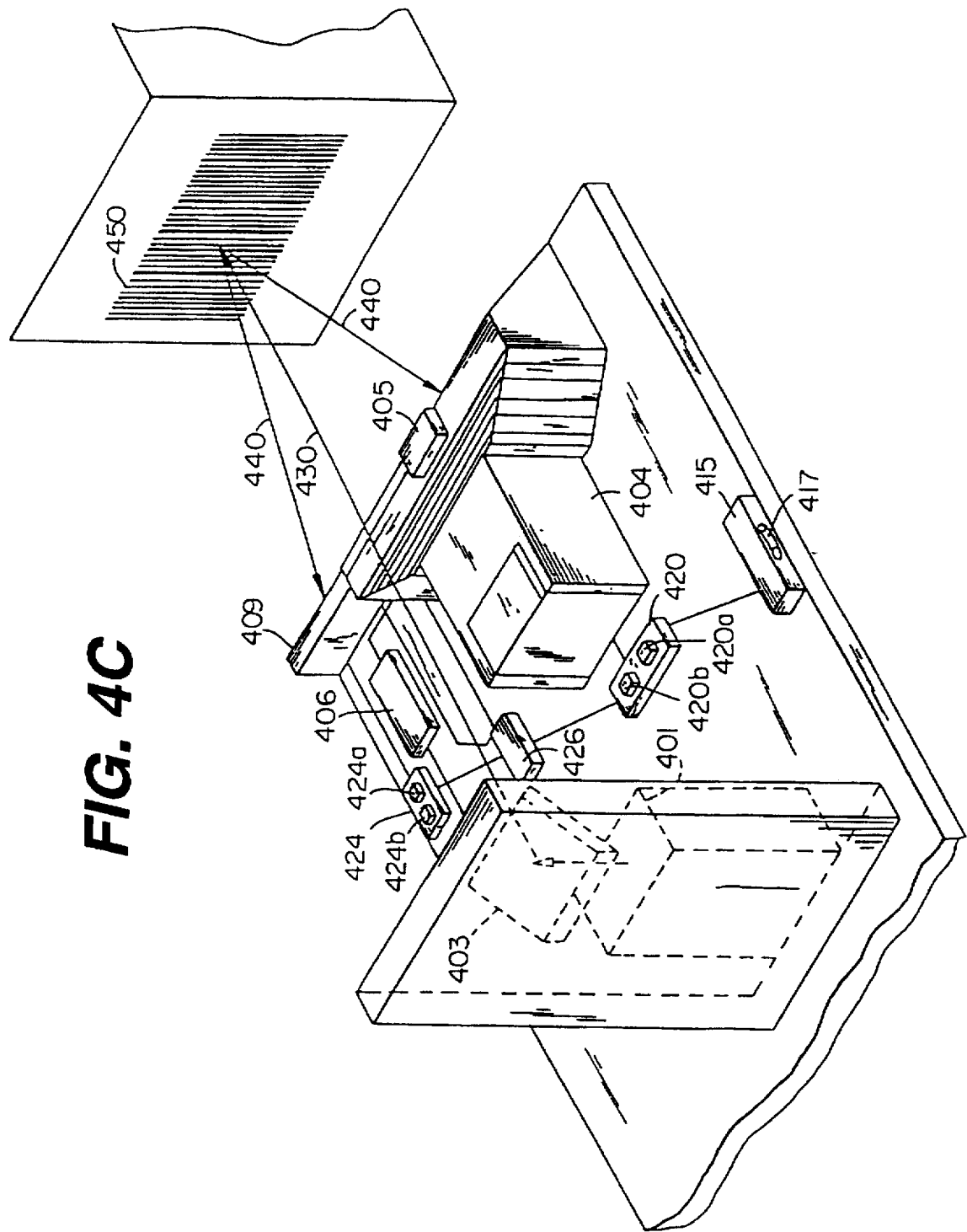

The FIG. 4C scanner, is an adaptation of the FIG. 4B scanner, which is particularly beneficial in operations where a single scanner with dual modalities is required or desired. Such a need may arise, for example, where different packages, each with a label which requires scanning and conforms to one of two symbology types, are inventoried in a similar location, such as a warehouse, trailer, or retail outlet, or are being moved along a single conveyor.

In such cases, one symbol type, such as a UPS or other matrix code, may be particularly suitable for imaging with CCD 404. Another symbol type, such as a bar code, may be more suitable for detection by a photodetector 409. The reflection of ambient or emitted light off one type of symbol may be used for imaging while the reflection of emitted light off the other type of symbol may be used for photodetection. The emitted light may, for example, be a flying spot visible light beam generated by a laser diode in scan assembly 401.

For such operations, as shown in FIG. 4C, both the CCD 404 and photodiode 409 are directed to scan a single targeted symbol 430 which may be either a UPC code or a UPS code, or other types of symbols conforming to differing symbology types. The CCD 404 images the reflection of visible ambient and/or emitted light off symbol 450. The photodiode 409 simultaneously detects the reflection of the flying spot light beam emitted by assembly 401 from the symbol 450. Symbol discriminators 420b and 424b respectively receive a signal corresponding to the electrical signal generated by the CCD 404 and a signal corresponding to the electrical signal generated by the photodiode 409. The respective signals are analyzed by symbol discriminators 420b and 424b.

In this case, if the signal received by discriminator 420b is determined by discriminator 420b to conform to UPSCODE(TM) symbology, the signal is decoded by decoder 420a and transmitted for storage, further processing, display or other operations, as appropriate. If, on the other hand, the imaged symbol is determined not to conform to UPSCODE(TM) then a signal is sent to the activator/deactivator 426 which accordingly sends a signal to deactivate the CCD. Preferably the CCD remains deactivated until a signal is transmitted from activator/deactivator 426 to deactivate photodiode 409, at which time activator/deactivator 426 also transmits a signal activating CCD 404. It will be understood that the deactivation of photodiode 409 and activation of CCD 404 will occur when a symbol subsequently targeted by the scanner conforms to UPSCODE(TM) rather than UPC code symbology.

Likewise, if the signal received by discriminator 424b is determined by discriminator 424b to conform to UPC code symbology, the signal is decoded by decoder 424a and transmitted from decoder 424a for storage, further processing, display or other operations, as appropriate. If, on the other hand, the detected symbol is determined not to conform to the UPC code symbology then a signal is sent by discriminator 424b to the activator/deactivator 426 which accordingly sends a signal to deactivate the photodiode 409. Preferably the photodiode remains deactivated until a signal is transmitted from activator/deactivator 426 to deactivate CCD 404, at which time activator/deactivator 426 also transmits a signal activating photodiode 409. Here to it should be understood that the activation of photodiode 409 and deactivation of CCD 404 will occur when a symbol subsequently targeted by the scanner is determined to conform to UPC code symbology rather than the UPSCODE (TM) symbology.

If desired, only a single detector, i.e. either the CCD or photodiode, could be initially activated. One or more indicators might also be provided to notify a user if the CCD or photodiode are active or have been activated or deactivated. Each scanner will also typically include one or more digitizers for digitizing a signal corresponding to an electrical signal generated by the CCD or photodiode, as applicable, prior to symbol discrimination and decoding. Additional photodetectors, CCD's and processors could be added, with minor modifications to the activator/deactivator 426, to provide for additional modalities and further flexibility in reading individual symbols which may be of any one of three or more symbology types. Furthermore, the activator/deactivator 426 could be eliminated if desired. In such a configuration, the CCD or photodiode could be selectively activated by, for example, a manual switching mechanism or could both be continuously activated irrespective of the symbology type of the symbols being targeted during a particular time period.

Using the FIG. 4C system, the scanner operates in two distinct modalities, one for reading bar code symbols and the other for reading matrix codes. The symbol discriminators 420b and 424b determine if the targeted symbol 430 is of a predetermined category or symbology type. If a signal is received by the activator/deactivator 426 from only one of the discriminators 420b and 424b, it indicates that the category of the targeted symbol necessarily conforms to the predetermined symbology type acceptable to the other symbol discriminator. If signals are received by activator/deactivator 426 from both discriminators 420b and 424b then the category of the targeted signal is necessarily outside the predetermined categories for the scanner. Hence, either of the two modalities are selected in response to a signal received from one of the two symbol discriminators. In one modality the CCD is activated to read matrix codes by imaging reflected ambient and/or emitted light. In the other modality the photodiode is activated to read bar codes, such as stacked bar codes or adjacent rows of linear bar codes, using emitted light, perhaps in the form of a flying spot light beam, reflected off the symbol.

Figure 6:
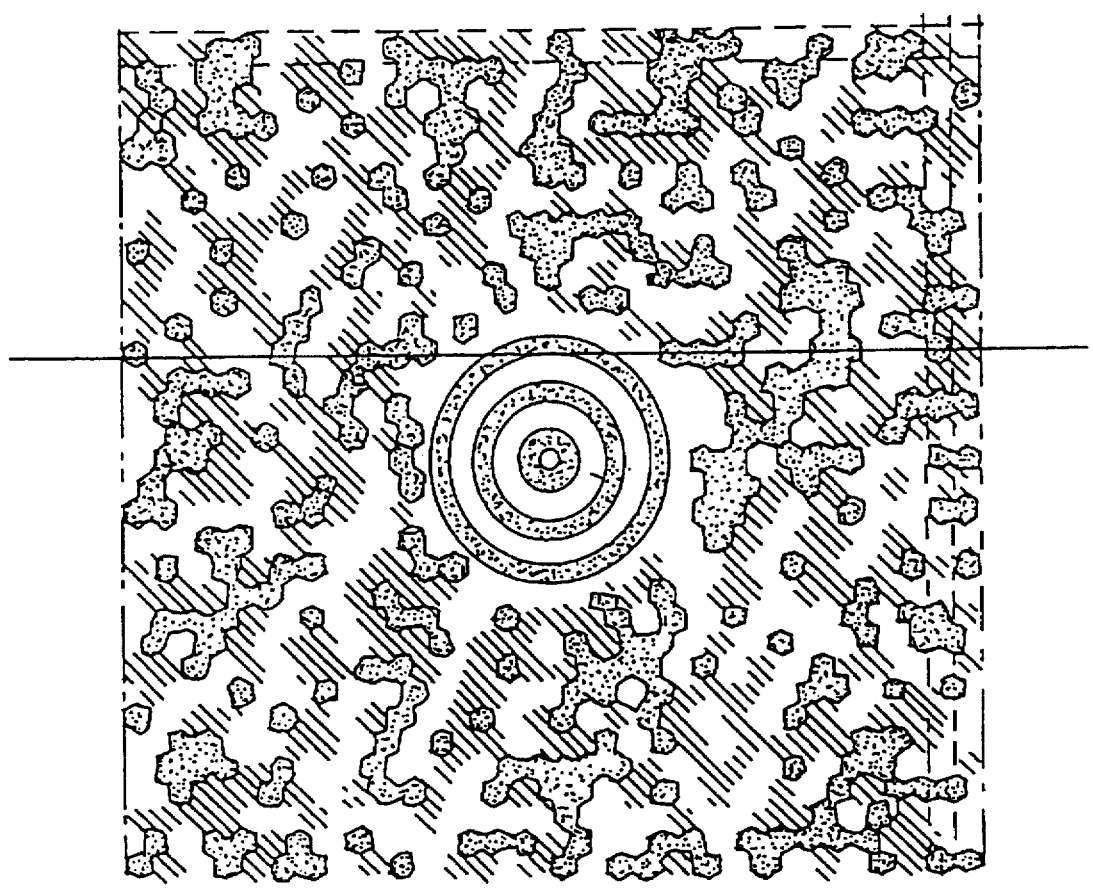
FIG. 6 depicts the scan line formed across a coded symbol using the hybrid scanner of FIG. 4A.

FIG. 6 depicts a single scan line capable of being generated by the scanner of FIGS. 4A, 4B and 4C across a UPS symbol formed with a matrix array of geometric shapes. By using a modified scan assembly 401 other scan patterns could be formed. For example, if desired a scanner assembly could be substituted which would generate a raster, omni-directional or other scan pattern.

Figure 7A:
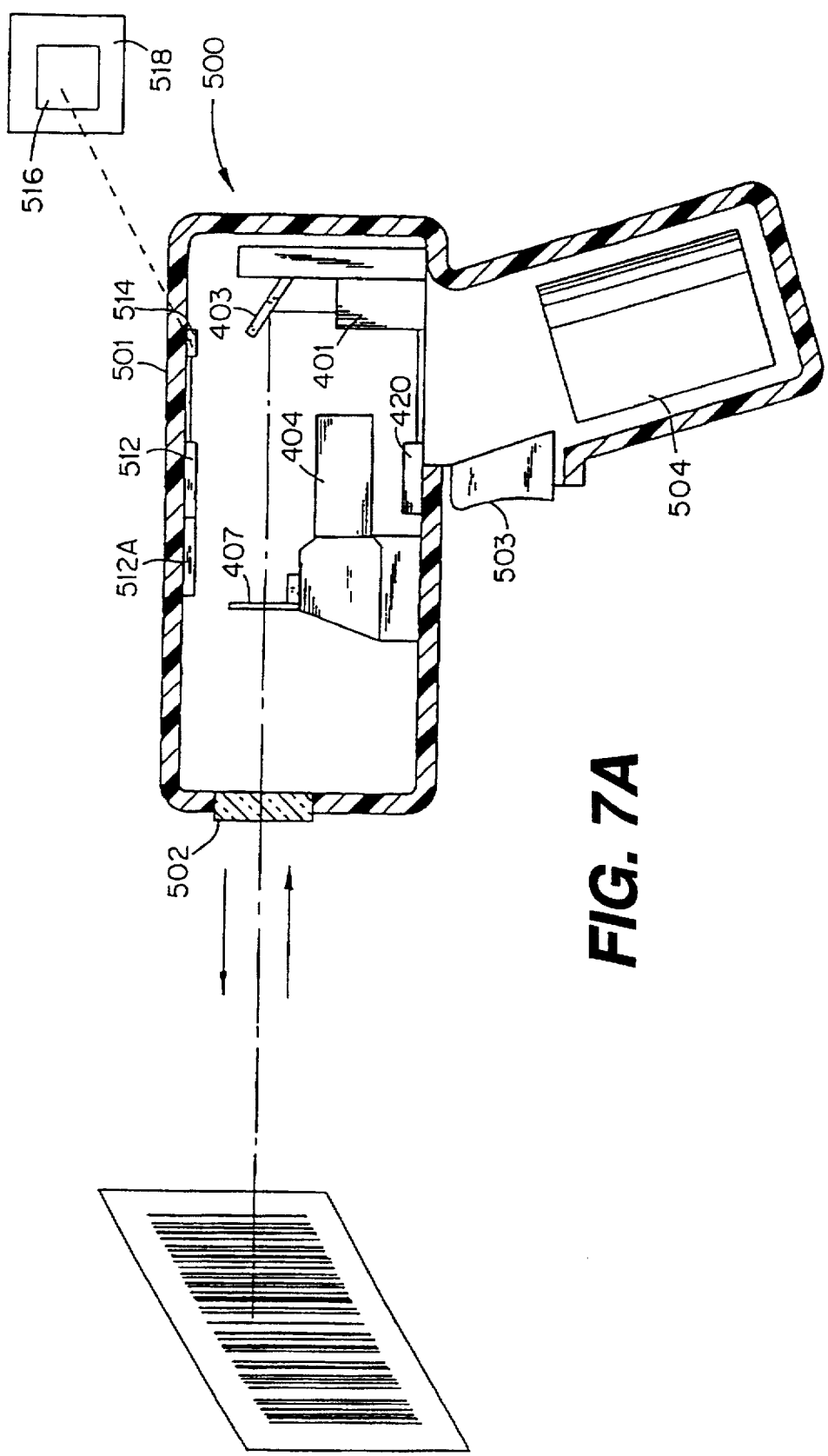
FIGS. 7A and 7B are respectively a simplified side sectional view and perspective view of the hybrid scanner of FIG. 4A, 4B or 4C housed in a narrow bodied, single windowed, gun-shaped housing.

FIG. 7A depicts a simplified sectional side view of a gun-shaped housing for a hybrid scanner of the type shown in FIGS. 4A, 4B or 4C. Gun-shaped housing 500 has a narrow body 501 and single window 502 through which the light beam is emitted and reflected light from the target enters the gun housing 500. A trigger switch 503 is provided for activating the scan assembly and detector, or detectors, and other components within the housing. The housing can house the processor 420 and other components described above, if provided. A battery 504 provides the power to the various components when the trigger 503 is squeezed. Conventional processing circuitry 512 is provided to generate a signal corresponding to the electrical signal generated by the sensor 404, and detector 409 (not shown) which is suitable for transmission by wireless transmitter 514 to a remote receiver 516 at, for example a central processing or electronic data storage device 518. The transmitter could if desired be a transceiver and might operate at radio or other frequencies which are suitable for accomplishing the transmission. The processing circuitry 512 includes an integrator 512A which processes the outputs of the individual detection elements of the CCD 404 into a single output signal prior to transmission.

Figure 7B:
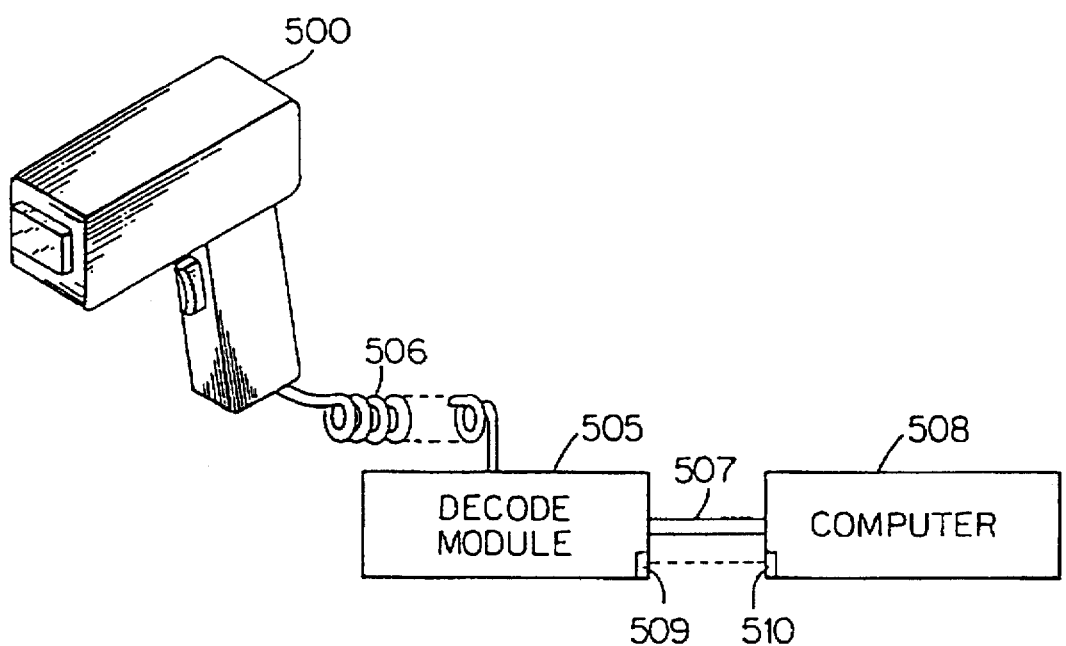

FIG. 7B depicts a perspective view of the gun-shaped scanner of FIG. 7A connected to a decode module 505 by a flexible cable 506. In this configuration, most, if not all, signal processing components and circuitry are located in the decode module rather than the gun-shaped housing. Electrical signals generated by the CCD 404 and/or photodiode 409 of FIGS. 4A–4C, or signals corresponding thereto, are transmitted from the gun-shaped housing 500 over the flexible cable 506 to the decode module 505. The decode module processes the received signal, preferably converting the received signal into a digitized signal and decoding the signal to obtain information representing the spatial intensity variations of the target. The decoded information can then be transmitted by way of communication cable 507 to a base computer 508 where the decoded information may be stored and/or further processed. Rather than a wire communication link 507, module 505 and computer 508 can be beneficially provided with transmitter or transceiver 509 and receiver or transceiver 510 to facilitate wireless communication of the decoded and other information. If transceivers are provided, a two-way communication link can be established such that information and instructions from computer 508 can, additionally, be transmitted to decode module 505.

Figure 8:
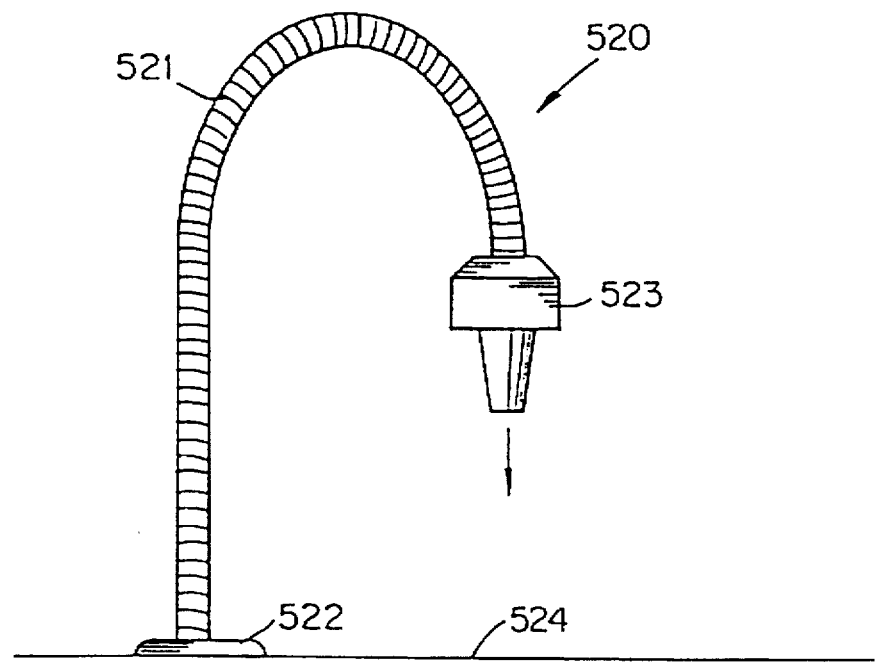
FIG. 8 depicts a goose head type housing, or what might alternatively be referred to as a goose neck type housing, for a hybrid scanner of FIG. 4A, 4B or 4C.

FIG. 8 depicts a goose head type stationary mount 520 which includes a flexible cantilevered portion 521 attached to a stabilizing base 522 and having a hybrid scanner housing portion 523 in which a hybrid scanner of the type shown in FIG. 4A, 4B or 4C is housed. The flexible cantilevered support member 521 can be adjusted to increase or decrease the distance between the housing 523 and the target. It also provides the flexibility to direct the emitted light in virtually any desired direction. The housing 523 can be fully rotated, i.e. 360°, around the base 522. As will be understood by those familiar with the art, the housing 523 can be directed to provide a light beam substantially parallel or perpendicular to the support structure 524 upon which the base 522 rests. Although a particular shape of housing 523 is depicted in FIG. 8, the housing shape could be in any desired form so long as one or more windows are placed in the housing which allow the emitted light beams and the reflected light from the target to pass in and out of the housing. Additionally, in lieu of housing 523, a mount (not shown) could, if desired, be provided on the end of the flexible cantilevered member 521 so as to accept the handle portion of, for example, the gun-shaped housing of FIG. 7A. Such a configuration would allow a hybrid scanner in a gun-shaped housing to be utilized both as a portable scanner and as a stationary scanner depending on the particular need.

Figure 9A:
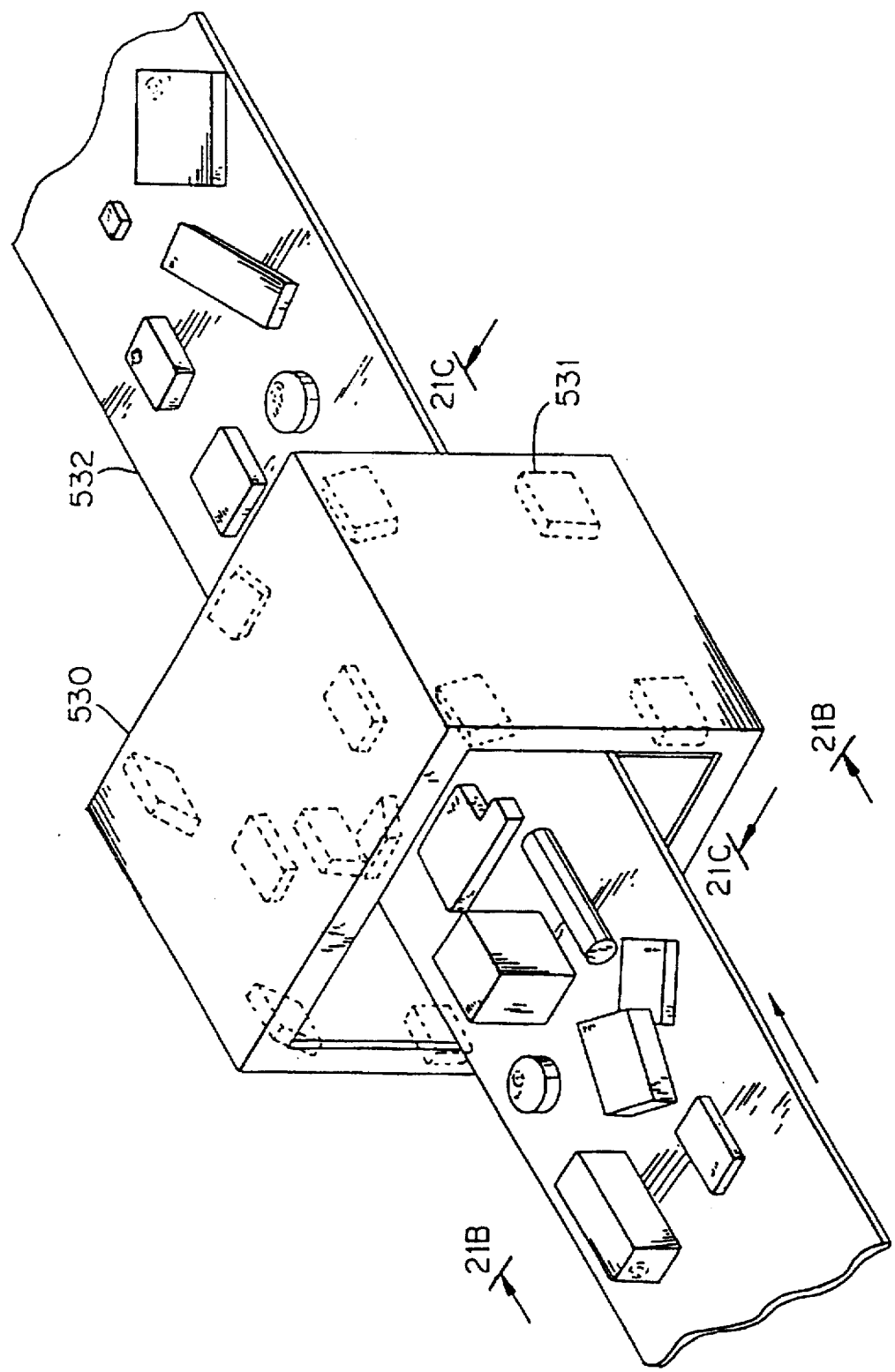
FIGS. 9A–9C depict a tunnel type scanner arrangement using multiple hybrid scanners of FIG. 4A, 4B or 4C.
Figure 9B:
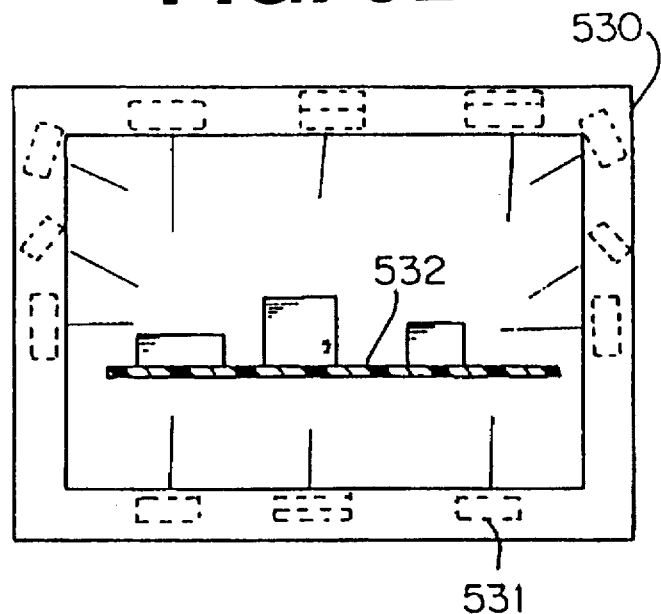
Figure 9C:
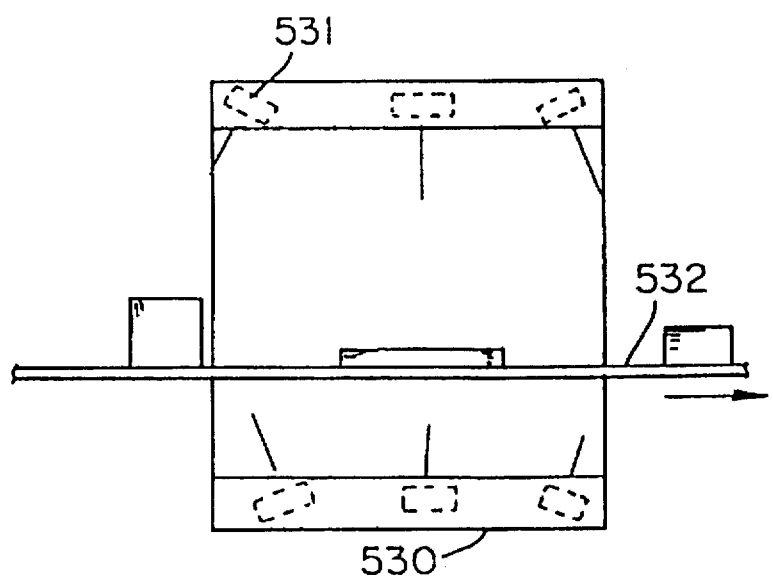

FIGS. 9A–9C depict hybrid scanners of the type shown in FIGS. 4A, 4B or 4C arranged as part of a tunnel scanning system. The supporting structure 530 supports multiple hybrid scanners 531. The scanners are arranged to scan symbols on packages moved along on a conveyor belt 532. The scanners are arranged and oriented in a precise manner so as to facilitate the reading of symbols no matter what orientation the package may be in as it moves along on the conveyor belt 532. As perhaps best shown in FIGS. 9B and 9C, the conveyor belt 532 is preferably made of a light transparent material so that scan components 531 can be located below the conveyor belt to read symbols which having an orientation opposed to the surface of the conveyor belt. Additionally, hybrid scanners are also supported so as to read symbols which are on an upstream or downstream face of a package during their movement through the tunnel scanning system.

FIG. 10 depicts a further tunnel scanner embodiment particularly suitable for locating and tracking packages being transported by truck. As shown, hybrid scanners 531 are supported around the opening in the trailer portion 541 of the truck 540. The scanning system can, for example, be activated upon opening the trailer door on the rear of the trailer portion 541. The hybrid scanners surround the opening and are oriented in a precise manner to provide a combined field of view which will allow a symbol located on a package being moved through the opening, for example, on slide 542 to be read no matter how the symbol may be oriented at the time it moves through the opening. If desired, a processor 543 and wireless transmitter or transceiver 544 can be mounted in the trailer portion 541 or elsewhere within truck 540 to process signals corresponding to an electrical signal generated by the CCD or photo detector of the hybrid scanner which obtains the read. The processed signal can if desired be communicated by wireless transmitter/transceiver 544 to a base station where the processed data is stored or utilized, for example, in notifying the owner of the goods being transported that shipment has begun or delivery has occurred. Processor 543 may also, if desired, include a storage device for storing the decoded information.

Figure 11:
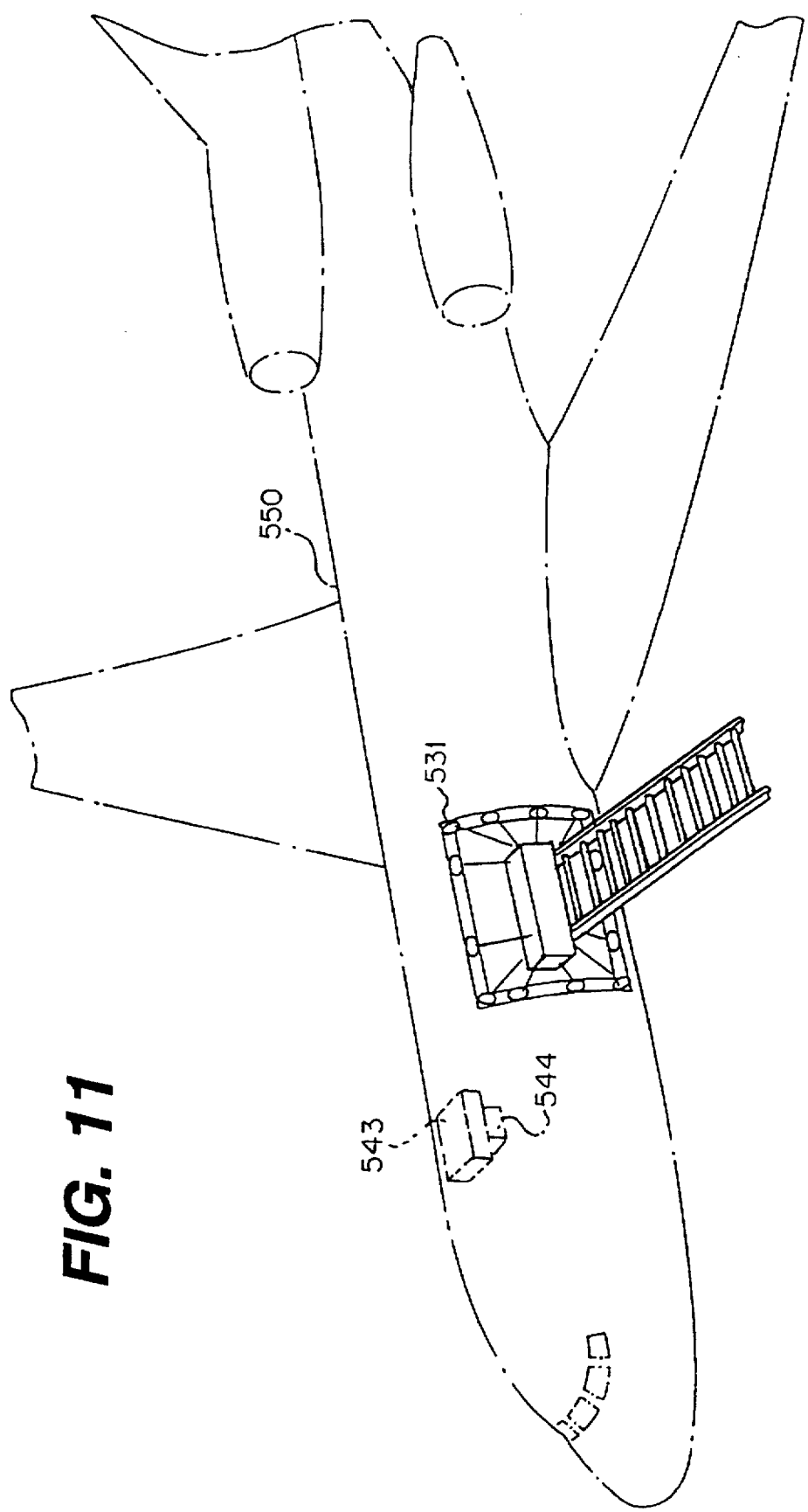
FIG. 11 depicts an aircraft mounting arrangement using multiple hybrid scanners of FIG. 4A, 4B or 4C.
Figure 12A:
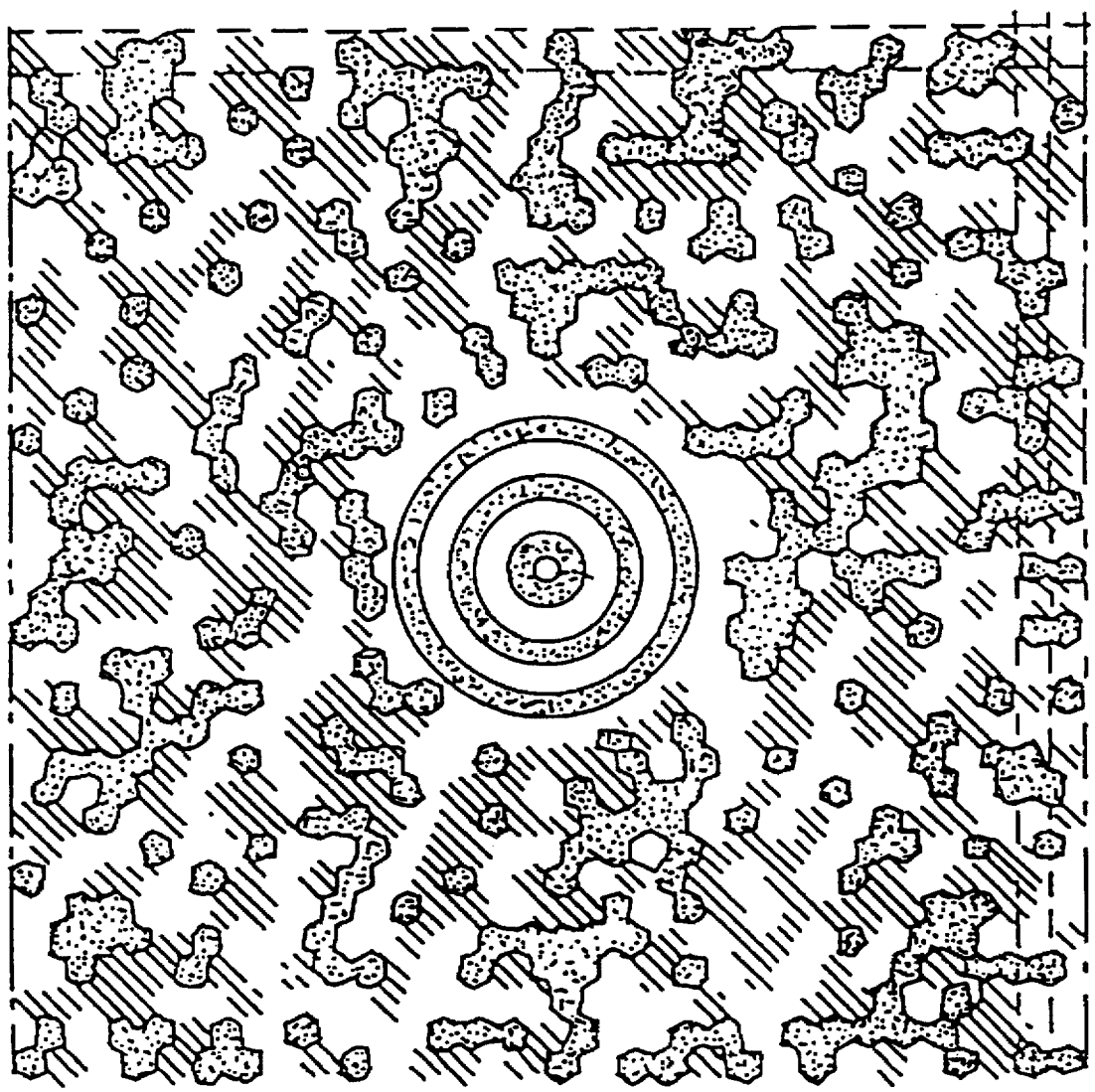
FIGS. 12A–12C depict symbols conforming to conventional matrix array and other symbologies.
Figures 12B, 12C:
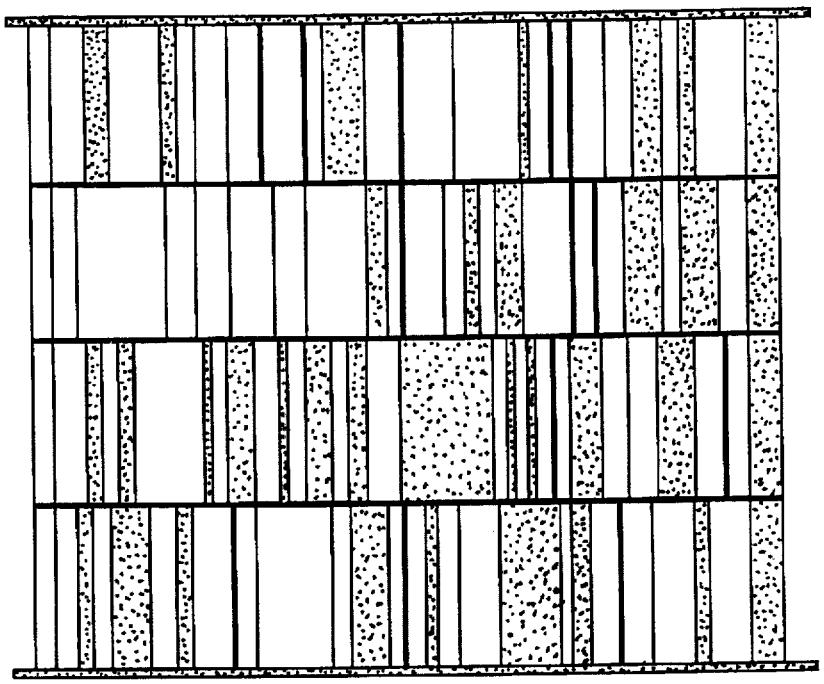

FIG. 11 shows a further application of a tunnel type scanning system utilizing the hybrid scanners of FIGS. 4A, 4B or 4C. Similar to the system shown in FIG. 10, hybrid scanners 531 are supported around an opening provided in the aircraft 550. The scanners are precisely oriented to provide an acceptable combined field of view such that the target symbol on the package can be satisfactorily read no matter what the orientation of the package as it moves through the opening enclosed by the tunnel scanning system. If desired, a processor 543 and wireless transmitter or transceiver 544, of the type described in FIG. 10, can also be provided.

Although certain embodiments of the invention have been discussed without reference to the scanner housing, triggering mechanism and/or other features of conventional scanners, it will be understood that a variety of housing styles and shapes and triggering mechanisms could be used. Other conventional features can also be included if so desired. The invention is directed primarily to a portable hand-held scanning device and tunnel type scanner system, and thus is preferably implemented using miniaturized components such as those described herein or in the materials referenced herein, or otherwise known in the art. However, the scanner of the present invention is not limited to use in portable devices or tunnel type scanner systems and can also be easily adapted for use in any housing which might be desirable or required for a particular application.

Additionally, even though the present invention has been described with respect to reading one or two-dimensional bar code and matrix array symbols, it is not limited to such embodiments, but may also be applicable to other indicia scanning or data acquisition applications. It is conceivable that the method of the present invention may also find application for use with various machine vision or optical character recognition applications in which information is derived from indicia such as printed characters or symbols, or from the surface or configurational characteristics of the article being scanned.

In all of the various embodiments, the elements of the scanner may be implemented in a very compact assembly or package such as a single printed circuit board or integral module. Such a board or module can interchangeably be used as the dedicated scanning element for a variety of different operating modalities and types of data acquisition systems. For example, the module may be alternately used in a hand-held manner, a table top goose neck scanner attached to a flexible arm or mounting extending over the surface of the table or attached to the underside of the table top, or mounted as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user "aiming" the scanner at the target; the table top scanner operated by the target moved rapidly through the scan field, or "presented" to a scan pattern which is imaged on a background surface. Still other modalities within the scope of the present invention envision the articles being moved past a plurality of scan modules oriented in different directions so at least the field of view allows one scan of a symbol which may be arbitrarily positioned on the article.

The module would advantageously comprise an optics subassembly mounted on a support, and an image sensor component. Control or data lines associated with such components may be connected to an electrical connector mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with one or more specific symbologies or printing densities. The characteristics may also be defined through the manual setting of control switches associated with the module or automatically. The user may also adapt the data acquisition system to scan different types of articles or the system may be adapted for different applications by interchanging modules in the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local or wide area network or with the telephone exchange network, either through a modem or an ISDN interface, or by low power radio broadcast from a portable terminal to a stationary or mobile receiver.

It will be understood that each of the features described above, or two or more together, may find a useful application in other types of scanners and readers differing from the types described above.

As described above, an improved indicia reader without the limitations of prior art readers is provided. The indicia reader is capable of providing an elongated scan line across indicia located close to the scanner head. The reader can read one or two-dimensional or even more complex indicia. The reader is also capable of being aimed or oriented while imaging the indicia. Laser scanning with CCD imaging is provided. The reader is capable of reading indicia of different symbology types including indicia comprised of a matrix array of geometric set shapes such as UPSCODE(TM).

The novel features characteristics of the invention are set forth in the appended claims. The invention itself, however, as well as other features and advantages thereof, will be best understood by reference to a detailed description of a specific embodiment, when read in conjunction with the accompanying drawings.

I claim:

1. A scanning device for reading indicia of differing light reflectivity comprising;
    a single light emitter for generating a scanning light beam to visually illuminate sequential portions of the indicia;
    a sensor for detecting light reflected from portions of the indicia by scanning a field of view and for generating an electrical signal representative of spatial intensity variations of said portions of the indicia; and
    a controller for automatically varying the rate of scanning of said sensor to read said indicia.

2. A device as defined in claim 1, wherein said single light emitter includes a laser diode.

3. A device as defined in claim 1, wherein said sensor is a linear array of charge coupled devices.

4. A device as defined in claim 1, wherein said sensor is a two-dimensional array of solid state imaging devices.

5. A device as defined in claim 1, further comprising an ambient light sensor for detecting the level of the ambient light in the field of view and for producing an output signal if the ambient light level is below a threshold value.

6. A device as defined in claim 5, further comprising means for activating said light emitter, and wherein said means for activating said light emitter is responsive to said output signal.

7. A device as defined in claim 6, wherein said means for activating said light emitter is also responsive to said electrical signal.

8. A device as defined in claim 1, wherein said indicia is a matrix code or bar code symbol in which information is encoded in a two-dimensional pattern.

9. A device as defined in claim 1, further comprising selection means for deactivating said single light emitter if the indicia is a symbol of a certain symbology category.

10. A device as defined in claim 1, wherein said electrical signal is representative of light produced by said single light emitter reflected from said indicia.

11. A device as defined in claim 1, wherein said electrical signal is representative of the ambient light reflected from said indicia.

12. A device as defined in claim 1, wherein the scan rate at which said sensor scans the field of view is faster than that of said scanning light beam.

13. A device as defined in claim 1, wherein said sensor scans a field of view at a scan rate substantially slower than the rate of scanning of said light beam.

14. A device as defined in claim 1, wherein said sensor periodically scans the field of view and then ceases to scan the field of view for a period of time.

15. A device as defined in claim 1, further comprising processing means including a symbology discriminator for discriminating between indicia of different symbology types.

16. A device as defined in claim 15, wherein one of said symbology types is a matrix array of geometric shapes.

17. A device as defined in claim 16, wherein said single light emitter is deactivated upon said processing means detecting a matrix array symbol.

18. A device as defined in claim 1, wherein said light emitter and said sensor are disposed in a hand-held housing.

19. A scanning device for reading indicia of differing light reflectivity comprising;
    a single light emitter for generating a scanning light beam to visually illuminate sequential portions of the indicia;
    an imager for detecting light reflected from portions of the indicia and for generating an electrical signal representative of spatial intensity variations of said portions of the indicia; and
    means for processing said electrical signal to determine whether the indicia is a linear or multidimensional symbol.

20. A scanning device for reading indicia having parts of different light reflectivity comprising:
    a light source for generating a visible light beam;
    an optical element for directing said visible light beam such that said visible light beam forms a scan line across said indicia;
    a sensor, including an array of individual detection elements, for detecting the reflected light from said indicia by imaging a field of view and for generating an electrical signal representing the spatial intensity variations of said indicia; and
    a controller operable to control said optical element to vary the scanning rate of said light beam across said indicia.

21. A scanning device according to claim 20, further comprising integrating means for processing the output of each of the individual detection elements to produce a single output signal.

22. A scanning device according to claim 21, wherein said individual detection elements are scanned at a variable scanning rate.

23. A scanning device according to claim 20, further comprising auto-focus optics for receiving the reflected light and adjusting the focal point of the image on the sensor array.

24. A scanning device according to claim 20, further comprising a light weight portable housing containing said light source, said optical element and said sensor.

25. A device as defined in claim 24, further comprising transmitter means in the housing for transmitting information through the air to a receiver located remotely from the device.

26. A device as defined in claim 20, wherein said individual detection elements are scanned at a scanning rate, and further comprising actuatable control means in the housing to change the scanning rate of the individual detection elements.

27. A method for reading indicia of differing light reflectivity comprising;
    generating a single scanning light beam to visually illuminate sequential portions of the indicia;
    imaging light reflected from portions of the indicia including the scanned field of view;
    automatically varying either the rate of said scanning light beam, or the imaging of said field of view, or both, to read the indicia; and generating an electrical signal representative of spatial intensity variations of said portions of the indicia.

28. A method as defined in claim 27, wherein said single scanning light beam is a laser light beam.

29. A method as defined in claim 27, further comprising the steps of detecting the level of the ambient light in a field of view and producing an output signal if the ambient light level is below a threshold value.

30. A method as defined in claim 29, further comprising the step of generating said single scanning light beam in response to said output signal.

31. A method as defined in claim 30, wherein said step of generating said single scanning light beam is also responsive to said electrical signal.

32. A method as defined in claim 27, wherein said indicia is a matrix code or bar code symbol in which information is encoded in a two-dimensional pattern.

33. A method for reading indicia of differing light reflectivity comprising:

generating a single scanning light beam to visually illuminate sequential portions of the indicia;

simultaneously imaging light reflected from portions of the indicia; and generating an electrical signal representative of spatial intensity variations of said portions of the indicia; and processing said electrical signal to determine whether the indicia is a linear or multidimensional symbol.

34. A method as defined in claim 27, further comprising the step of terminating the generating of said light beam if the symbol is of a certain symbology category.

35. A method as defined in claim 27, wherein said electrical signal is representative of light from said single light beam reflected from said indicia.

36. A method as defined in claim 27, wherein said electrical signal is representative of ambient light reflected from said indicia.

37. A method as defined in claim 27, wherein said rate of imaging is faster than the rate of scanning of said light beam.

38. A method as defined in claim 27, wherein said rate of imaging is substantially slower than the rate of scanning of said light beam.

39. A method as defined in claim 27, wherein said imaging periodically images the field of view and then ceases to image the field of view for a period of time.

40. A method as defined in claim 27, further comprising the steps of discriminating between indicia of different symbology types.

41. A method as defined in claim 40, wherein one of said symbology types is a matrix array of geometric shapes.

42. A method as defined in claim 41, wherein said generating of said single light beam is terminated upon detecting a matrix array symbol during said processing.

43. A method for reading indicia having parts of different light reflectivity comprising:

generating a visible light beam;

directing said visible light beam such that said visible light beam forms a scan line across said indicia at a first scan rate;

imaging the reflected light from said indicia by scanning a field of view including the indicia at a second scan rate;

varying at least one of said first scan rate and said second scan rate to obtain a read of said indicia; and generating an electrical signal representing the spatial intensity variations of said indicia.

44. A method according to claim 43, wherein multiple output signals are provided by said imaging, and further comprising the step of processing the multiple output signals to generate a single output signal.

45. A method according to claim 43, further comprising the steps of receiving the reflected light and adjusting said imaging in response to the received reflected light.

46. A method as defined in claim 43, further comprising the step of transmitting information represented by said electrical signal through the air to a remote location.

* * * * *